United States Patent
Komori

(10) Patent No.: US 8,310,303 B2
(45) Date of Patent: Nov. 13, 2012

(54) DEMODULATOR AND COMMUNICATION APPARATUS

(75) Inventor: Kenji Komori, Kanagawa (JP)

(73) Assignee: Sony Corporation, Tokyo (JP)

( * ) Notice: Subject to any disclaimer, the term of this patent is extended or adjusted under 35 U.S.C. 154(b) by 129 days.

(21) Appl. No.: 12/662,670

(22) Filed: Apr. 28, 2010

(65) Prior Publication Data
US 2010/0303184 A1    Dec. 2, 2010

(30) Foreign Application Priority Data
May 29, 2009    (JP) ................... 2009-131094

(51) Int. Cl.
*H03D 3/06* (2006.01)
*H03D 3/00* (2006.01)

(52) U.S. Cl. ......... 329/324; 329/315; 455/130; 455/208

(58) Field of Classification Search ............ 329/315, 329/323, 324, 345, 346, 358, 318, 319, 320, 329/349, 353; 455/195.1, 196.1, 205, 208, 455/255, 256, 257, 334, 313, 318
See application file for complete search history.

(56) References Cited

U.S. PATENT DOCUMENTS

| | | | |
|---|---|---|---|
| 5,650,749 A * | 7/1997 | Main | 329/324 |
| 6,690,225 B2 * | 2/2004 | Kondo et al. | 327/307 |
| 7,421,260 B2 * | 9/2008 | Darabi | 455/130 |
| 2007/0002974 A1 * | 1/2007 | Ibrahim et al. | 375/324 |
| 2008/0090545 A1 * | 4/2008 | Tokairin et al. | 455/343.1 |

FOREIGN PATENT DOCUMENTS

JP   2003283358 A * 10/2003
JP   2005-295594 A   10/2005

* cited by examiner

*Primary Examiner* — Ryan Johnson
(74) *Attorney, Agent, or Firm* — Rader Fishman & Grauer, PLLC

(57) ABSTRACT

Disclosed herein is a demodulator, including: a frequency synchronization section adapted to synchronize a frequency of a local oscillation signal to be produced on the demodulator side with a local oscillation frequency of a modulation signal transmitting from a modulator side; a demodulation signal production section adapted to produce a demodulation signal based on the local oscillation signal synchronized by the frequency synchronization section and the modulation signal transmitted from the modulator; and a direct current correction section adapted to detect a direct current voltage of the demodulation signal from the demodulation signal produced by the demodulation signal production section and correct the direct current voltage of the demodulation signal so that the direct current voltage becomes equal to a reference voltage set in advance.

11 Claims, 19 Drawing Sheets

F I G . 2
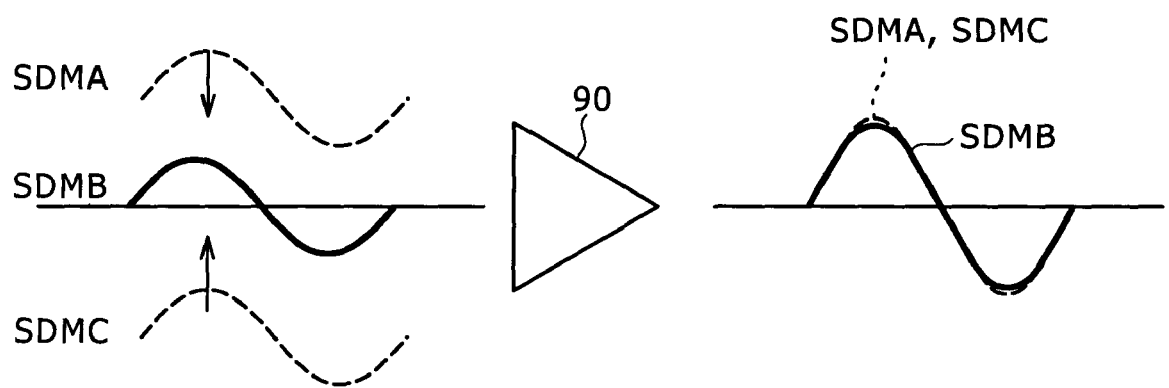

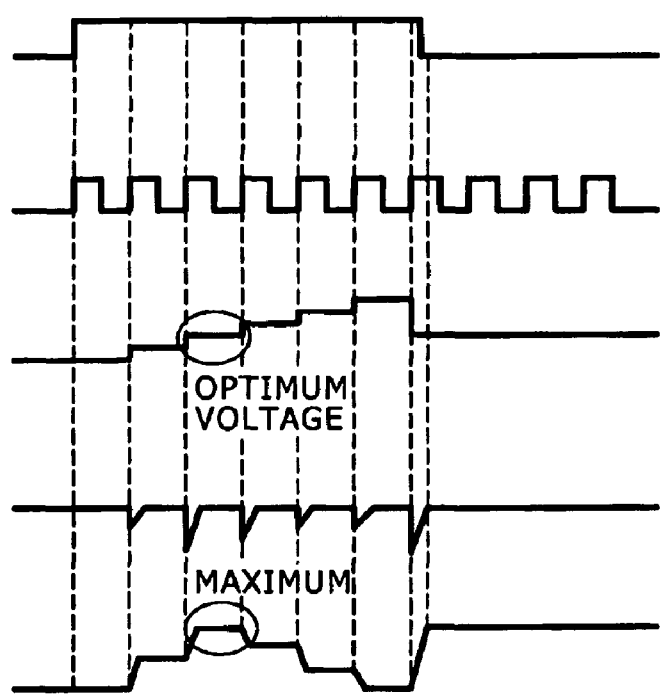

RELATED ART

RELATED ART

DEMODULATOR AND COMMUNICATION APPARATUS

BACKGROUND OF THE INVENTION

1. Field of the Invention

This invention relates to a demodulator and a communication apparatus, and more particularly to a demodulator and a communication apparatus wherein a DC (direct current) voltage of a demodulation signal produced in response to a phase difference between a local oscillation signal and a modulation signal synchronized in frequency with the local oscillation signal is detected and correction is carried out so that the detected DC voltage becomes equal to a reference voltage set in advance.

2. Description of the Related Art

A direct conversion method is known as a method of converting a high frequency signal of a carrier frequency directly into a baseband signal. Here, a communication apparatus of a popular direct conversion method is described. The communication apparatus includes a modulator and a demodulator. In the modulator, a modulation object signal is amplified by an amplifier and inputted to a mixer, and the modulation object signal and a local oscillation signal are multiplied by the mixer to produce a modulation signal. The amplifier amplifies the modulation signal produced by the mixer and transmits the produced modulation signal from an antenna to the demodulator.

On the other hand, in the demodulator, the modulation signal transmitted from the modulator is received by an antenna and amplified by an amplifier and then inputted to a mixer. The mixer multiplies the modulation signal received by the antenna and a local oscillation signal on the demodulator side to obtain a demodulation signal.

At this time, a frequency synchronization section in the form of a PLL circuit provided in the demodulator synchronizes the frequency of the local oscillation signal on the demodulator side with the frequency of the local oscillation signal on the modulator side so that the frequencies of the local oscillation signals on the modulator side and the demodulator side are set equal to each other. By the countermeasure described, a demodulation process with a high degree of accuracy can be achieved.

Here, frequency allocations in a case wherein frequency synchronization of a local oscillation signal is carried out and frequency allocations in another case wherein frequency, synchronization of a local oscillation signal is not carried out are described. FIG. 17A illustrates a frequency allocation of a local oscillation signal and a modulation signal on the modulator side where frequency synchronization of the local oscillation signal is carried out, and FIG. 17B illustrates a frequency allocation of a local oscillation signal and a modulation signal on the modulator side where frequency synchronization of the local oscillation signal is not carried out. FIG. 17C illustrates a frequency allocation of a demodulation signal where frequency synchronization is carried out, and FIG. 17D illustrates a frequency allocation of a demodulation signal where frequency synchronization is not carried out.

If a demodulation signal is produced where frequency synchronization is not carried out, then an offset of a frequency which corresponds to a frequency error between the local oscillation signal on the modulator side and the local oscillation signal on the demodulator side appears as seen from FIGS. 17B and 17D. As a result, a problem arises that the quality of the demodulation signal is deteriorated significantly. On the other hand, where frequency synchronization is carried out, the frequencies of the local oscillation signals of the modulator side and the demodulator side are held in synchronism with each other as seen in FIGS. 17A and 17C. Consequently, the demodulator side can obtain a demodulation signal of a desired frequency.

Incidentally, in recent years, communication apparatus which use a frequency of a millimeter waveband exceeding 30 GHz have been developed. However, if a frequency of a millimeter waveband is used in a communication apparatus which includes a PLL circuit described above, then there is a problem that a phase synchronization circuit such as a PLL circuit used for frequency synchronization has a comparatively great size. Further, where a frequency of a millimeter waveband is used, it is not easy to maintain the frequency dividing performance, the isolation performance and so forth of the PLL circuit. If it is tried to enhance the frequency accuracy in order to maintain the performances, then this gives rise to increase of the circuit scale and increase of the cost by the adjustment function. On the contrary, if the circuit scale is reduced, then this gives rise to a problem that the frequency error increases, resulting in degradation of the performances of the PLL circuit and so forth.

Thus, a communication apparatus of the injection lock system which carries out frequency synchronization without using a frequency synchronization circuit has been proposed. The injection lock system is a system which injects a frequency component of a local oscillator, that is, a local oscillation signal, on the modulator side into a local oscillator on the demodulator side to synchronize the frequency using the local oscillation itself.

FIG. 18 shows an example of a configuration of a demodulator 200 of the injection lock system, and FIG. 19 shows waveforms of a demodulation signal obtained by the demodulator 200. A modulation signal and a local oscillation signal are transmitted simultaneously from a modulator not shown. The demodulator 200 distributes and injects a modulation signal SRF amplified by an amplifier 202 into a local oscillator 206. The local oscillator 206 synchronizes the local oscillation frequency of the demodulator side with a carrier component of the modulation signal SRF of the modulator side injected thereto to produce a local oscillation signal SLO and outputs the local oscillation signal SLO to a mixer 204. The mixer 204 multiplies the local oscillation signal SLO inputted thereto and the modulation signal SRF to produce a demodulation signal. The produced demodulation signal is amplified by an amplifier 208 and then outputted.

As a communication apparatus which adopts the injection lock system, a communication apparatus has been proposed and is disclosed, for example, in Japanese Patent Laid-Open No. 2005-295594 (hereinafter referred to as Patent Document 1) wherein a reception side local oscillation wave is reproduced in synchronism with a low frequency local frequency signal wave included in a signal wave transmitted from a modulator. With this communication apparatus, the frequency of a signal wave can be converted with a high degree of accuracy by use of the reproduced reception side local oscillation wave.

SUMMARY OF THE INVENTION

However, the communication apparatus which adopt the injection lock system described above have the following problems.

(i) The mixer 204 of the existing demodulator 200 which adopts the injection lock system shown in FIG. 18 carries out multiplication of the local oscillation signal SLO synchronized in frequency on the demodulator 200 side with the modulation signal SRF from the modulator in accordance with the following expression (1):

$$\cos(w1) \times \cos(w1+\theta) = \tfrac{1}{2} \times \cos(\theta) \quad (1)$$

Since, in the expression (1) above, multiplication of the same frequency component is carried out, a DC component of a cosine of the phase difference θ is produced. For example, where an ASK (amplitude modulation) method which is suitable, for example, to simplify a circuit configuration for modulation and demodulation to achieve reduction in costs is used, in order to increase the communication distance, it is necessary to set the phase difference θ to zero and enhance the reception efficiency. This, however, gives rise to increase of the DC component.

As a result, if the demodulation signals A and C having a DC offset are amplified by the amplifier 208 of a high gain as seen in FIG. 19, then the demodulation signals A and C are clipped at broken line portions thereof by the DC offset. This results in a problem that no more sufficient amplitude can be obtained and the isolation performance of a digital demodulation signal is degraded.

(ii) Meanwhile, the communication apparatus disclosed in Patent Document 1 has a drawback that, since the frequency of the demodulation signal is displaced by an amount of the offset, a circuit configuration for converting a frequency by the amount of the offset again is required.

Therefore, it is desirable to provide a demodulator and a communication apparatus which can carry out demodulation with a high degree of accuracy.

According to an embodiment of the present invention, there is provided a demodulator including a frequency synchronization section, a demodulation signal production section, and a direct current correction section. The frequency synchronization section is adapted to synchronize a frequency of a local oscillation signal to be produced on the demodulator side with a local oscillation frequency of a modulation signal transmitting from a modulator side. The demodulation signal production section is adapted to produce a demodulation signal based on the local oscillation signal synchronized by the frequency synchronization section and the modulation signal transmitted from the modulator. The direct current correction section is adapted to detect a direct current voltage of the demodulation signal from the demodulation signal produced by the demodulation signal production section and correct the direct current voltage of the demodulation signal so that the direct current voltage becomes equal to a reference voltage set in advance.

According to another embodiment of the present invention, there is provided a demodulator including a frequency synchronization section, a demodulation signal production section, a first direct current correction section, and a second direct current correction section. The frequency synchronization section is adapted to synchronize a frequency of a local oscillation signal to be produced on the demodulator side with a local oscillation frequency of a modulation signal transmitting from a modulator side. The demodulation signal production section is adapted to produce first and second differential demodulation signals based on the local oscillation signal synchronized by the frequency synchronization section and the modulation signal transmitted from the modulator. The first direct current correction section is adapted to detect a first direct current voltage from the first demodulation signal produced by the demodulation signal production section and correct the first direct current voltage so that the first direct current voltage becomes equal to a first reference voltage set in advance. The second direct current correction section is adapted to detect a second direct current voltage from the second demodulation signal produced by the demodulation signal production section and correct the second direct current voltage so that the second direct current voltage becomes equal to a second reference voltage set in advance.

According to a further embodiment of the present invention, there is provided a demodulator including a frequency synchronization section, a demodulation signal production section, and a direct current correction section. The frequency synchronization section is adapted to synchronize a frequency of a local oscillation signal to be produced on the demodulator side with a local oscillation frequency of a modulation signal transmitting from a modulator side. The demodulation signal production section is adapted to produce first and second differential demodulation signals based on the local oscillation signal synchronized by the frequency synchronization section and the modulation signal transmitted from the modulator. The direct current correction section is adapted to detect a first direct current voltage of the demodulation signal from the first demodulation signal produced by the demodulation signal production section and detect a second direct current voltage of the demodulation signal from the second demodulation signal and then correct at least one of the first direct current voltage and the second direct current voltage so that a potential difference between the first direct current voltage and the second direct current voltage becomes minimum.

According to a still further embodiment of the present invention, there is provided a communication apparatus including a modulator, a frequency synchronization section, a demodulation signal production section, and a demodulator. The modulator is adapted to modulate a modulation object signal with a first local oscillation signal to produce a modulation signal and transmit the produced modulation signal. The frequency synchronization section is adapted to synchronize a frequency of a second local oscillation signal to be produced on the demodulator side with a local oscillation frequency of the modulation signal transmitting from the modulator. The demodulation signal production section is adapted to produce a demodulation signal based on the second local oscillation signal synchronized by the frequency synchronization section and the modulation signal transmitted from the modulator. The demodulator has a direct current correction section adapted to detect a direct current voltage of the demodulation signal from the demodulation signal produced by the demodulation signal production section and correct the direct current voltage of the demodulation signal so that the direct current voltage becomes equal to a reference voltage set in advance.

In each of the demodulators and the communication apparatus, the frequency synchronization section of the modulator synchronizes the frequency of the local oscillation signal to be produced on the demodulator side with the local oscillation frequency of the modulation signal transmitted to the demodulator from the modulator side in accordance with the injection lock system. The synchronized local oscillation signal is multiplied by the modulation signal transmitted from the modulator by the demodulation signal production section to produce a demodulation signal. At this time, a direct current component or direct current voltage is produced in the demodulation signal in response to a phase difference between the local oscillation signal and the modulation signal synchronized in phase with the local oscillation signal. The direct current correction section detects the direct current voltage of the demodulation signal and corrects the direct current voltage so as to be equal to a reference voltage set in advance.

Consequently, even when the demodulation signal is amplified by an amplifier, since the direct current voltage of the demodulation signal is suppressed to the reference signal, an otherwise possible clip can be prevented. Consequently, a sufficient amplitude can be obtained. As a result, improvement in performance of the modulation can be implemented.

With the demodulators and the communication apparatus, since the direct current voltage of the demodulation signal is corrected so as to become equal to the reference voltage, the demodulation operation can be stabilized and the linearity and the output amplitude of the demodulation output can be increased. Consequently, performance improvement of the modulator can be implemented.

BRIEF DESCRIPTION OF THE DRAWINGS

FIG. 2 is a diagrammatic view illustrating an example of amplification of a demodulation signal having a corrected DC voltage;

FIGS. 11A to 11E are timing charts illustrating an example of operation of the DC correction section and the phase correction section shown in FIG. 10;

DETAILED DESCRIPTION OF THE PREFERRED EMBODIMENTS

In the following, embodiments of the present invention are described successively in the following order.
1. First Embodiment (example of correction control of the DC voltage of the demodulation signal)
2. Second Embodiment (example of control of correction of the DC voltage: example wherein differential outputs are used)
3. Third Embodiment (example of control of correction of the DC voltage; example wherein differential outputs are used)
4. Fourth Embodiment (example of correction control of the phase of the local oscillation signal)
5. Fifth Embodiment (example of correction control of the phase of a local oscillation signal; example wherein differential outputs are used)
6. Sixth Embodiment (example of correction control of the phase of a local oscillation signal; example wherein differential outputs are used)

First Embodiment

Example of the Configuration of the Communication Apparatus

Figure 1:
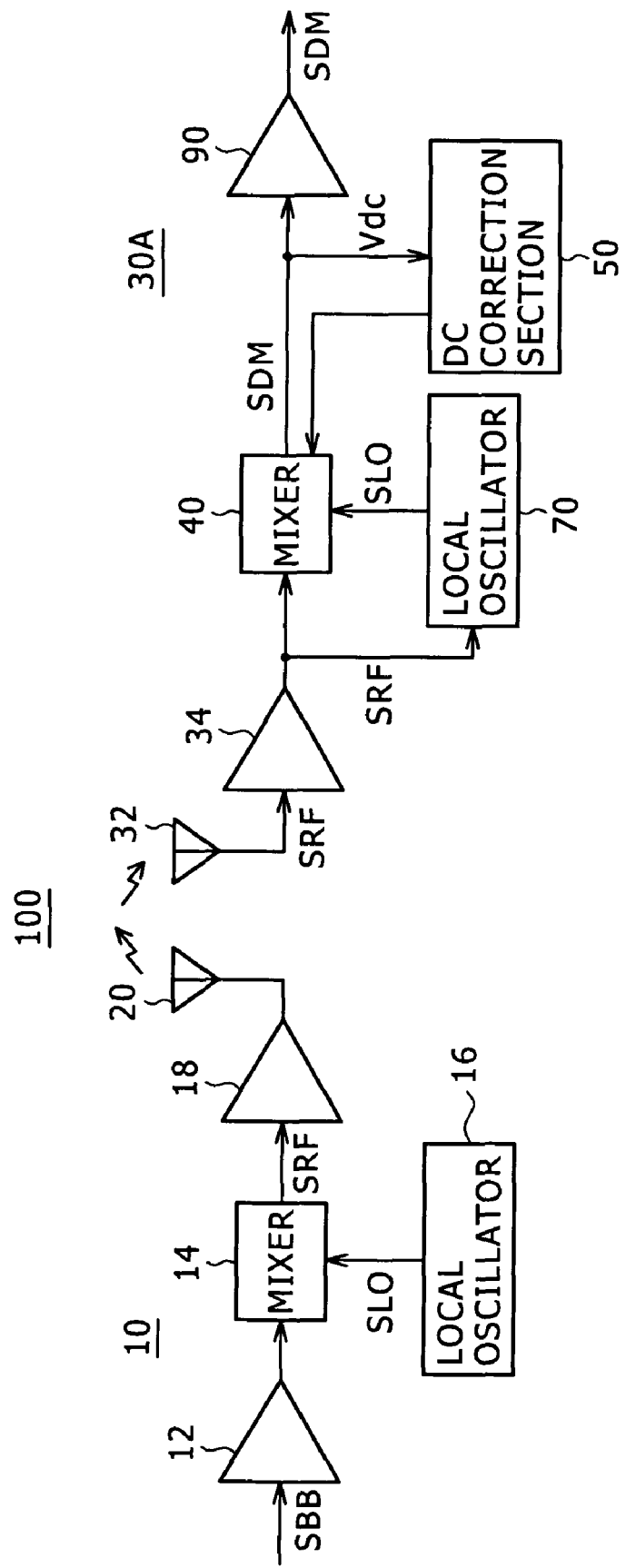
FIG. 1 is a block diagram showing an example of a configuration of a communication apparatus according to a first embodiment of the present invention.

FIG. 1 shows an example of a configuration of a communication apparatus 100 of the direct conversion type according to an embodiment of the present invention. Referring to FIG. 1, the communication apparatus 100 includes a modulator 10 and a demodulator 30A and transmits a signal having a frequency in a millimeter waveband from 30 GHz to 300 GHz.

[Example of the Configuration of the Modulator]

The modulator 10 includes amplifiers 12 and 18, a mixer 14, a local oscillator 16 and an antenna 20. The amplifier 12 amplifies a modulation object signal SBB such as a baseband signal inputted thereto and supplies the amplified modulation object signal SBB to the mixer 14. The local oscillator 16 produces and supplies a local oscillation signal SLO in the millimeter waveband to the mixer 14. The mixer 14 multiplies the modulation object signal SBB inputted thereto from the amplifier 12 and the local oscillation signal SLO inputted thereto from the local oscillator 16 to produce a modulation signal SRF. The amplifier 18 amplifies and supplies the modulation signal SRF supplied thereto from the mixer 14 to the antenna 20. The modulation signal SRF amplified by the amplifier 18 is transmitted from the antenna 20 to the demodulator 30A.

[Example of the Configuration of the Demodulator]

The demodulator 30A includes an antenna 32, amplifiers 34 and 90, a mixer 40, a local oscillator 70 and a DC correction section 50. The modulation signal SRF transmitted from the modulator 10 is received by the antenna 32 of the demodulator 30A and supplied to the amplifier 34. The amplifier 34 amplifies the modulation signal SRF inputted thereto. The amplified modulation signal SRF is distributed to the mixer 40 and the local oscillator 70. The modulation signal SRF distributed to the local oscillator 70 is hereinafter referred to as injection signal SRF.

The local oscillator 70 is an example of a frequency synchronization section, and produces a local oscillation signal SLO of the millimeter waveband having a local oscillation frequency synchronized with the frequency of the carrier component of the modulation signal SRF injected from the amplifier 34 and supplies the local oscillation signal SLO to the mixer 40. The mixer 40 is an example of a modulation signal production section, and multiplies the modulation signal SRF inputted thereto from the amplifier 34 and the local oscillation signal SLO inputted from the local oscillator 70 to produce a demodulation signal SDM and outputs the demodulation signal SDM to the amplifier 90 and the DC correction section 50.

Here, a relationship between the phase difference between the injection signal SRF and the local oscillation signal SLO and the DC voltage is described. Where the frequency of the local oscillation signal SLO is in synchronism with the frequency of the injection signal SRF, the DC component, that is, the DC voltage Vdc, of the demodulation signal SDM varies in response to the phase difference between the local oscillation signal SLO and the injection signal SRF. At this time, when the DC voltage Vdc of the demodulation signal SDM is maximum, the local oscillation signal SLO and the injection signal SRF are in phase with each other, and the local oscillation signal SLO is synchronized with the injection signal SRF (refer to FIG. 12).

The DC correction section 50 extracts the DC component of the demodulation signal SDM supplied thereto from the mixer 40 and produces a DC correction amount based on the DC offset from a reference voltage Vref from the extracted DC component. Then, the DC correction section 50 feeds back the produced DC correction amount to the mixer 40. Consequently, the DC component of the demodulation signal SDM is corrected, and the demodulation signal SDM after the correction is outputted to the amplifier 90. This correction controlling operation is hereinafter described in detail.

Figure 19:
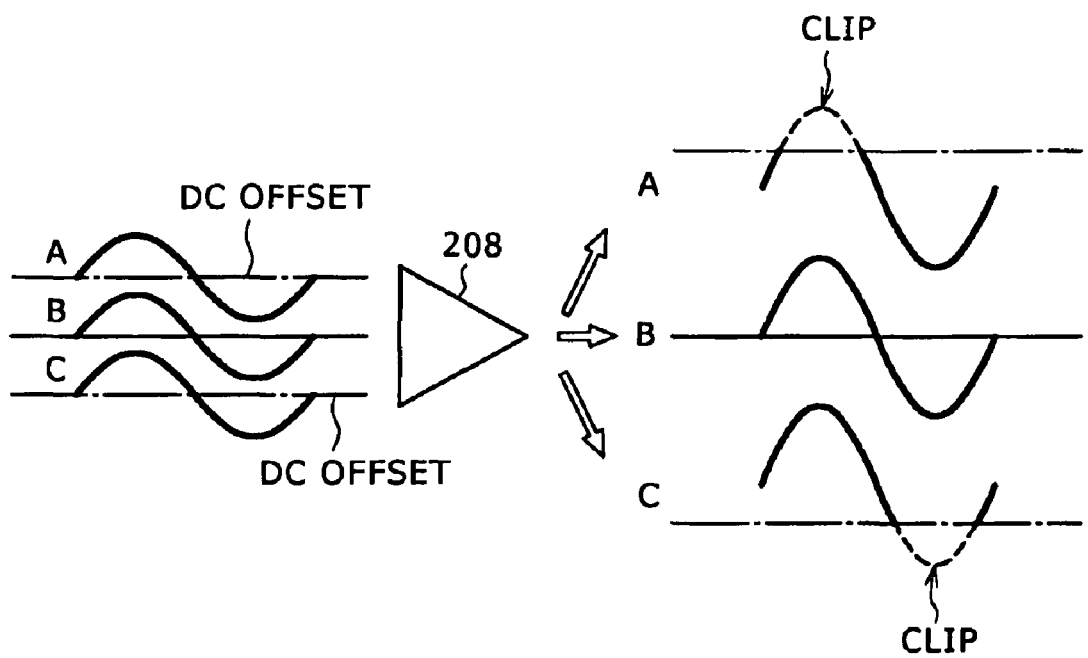
FIG. 19 is a diagrammatic view illustrating an example of existing amplification of a modulation signal having a DC voltage.

The amplifier 90 amplifies and supplies the demodulation signal SDM supplied thereto from the mixer 40 to the amplifier 90. For example, the DC voltage of the demodulation signals SDMA and SDMC each having a DC component is corrected to a reference voltage for the demodulation signal SDM by the DC correction section 50 and so forth described above. Therefore, according to the present embodiment, even where the demodulation signals SDMA and SDMC are amplified by the amplifier 90, occurrence of such a clip as described hereinabove with reference to FIG. 19 can be prevented.

[Example of the Configuration of the Mixer and the DC Correction Section]

Figure 3:
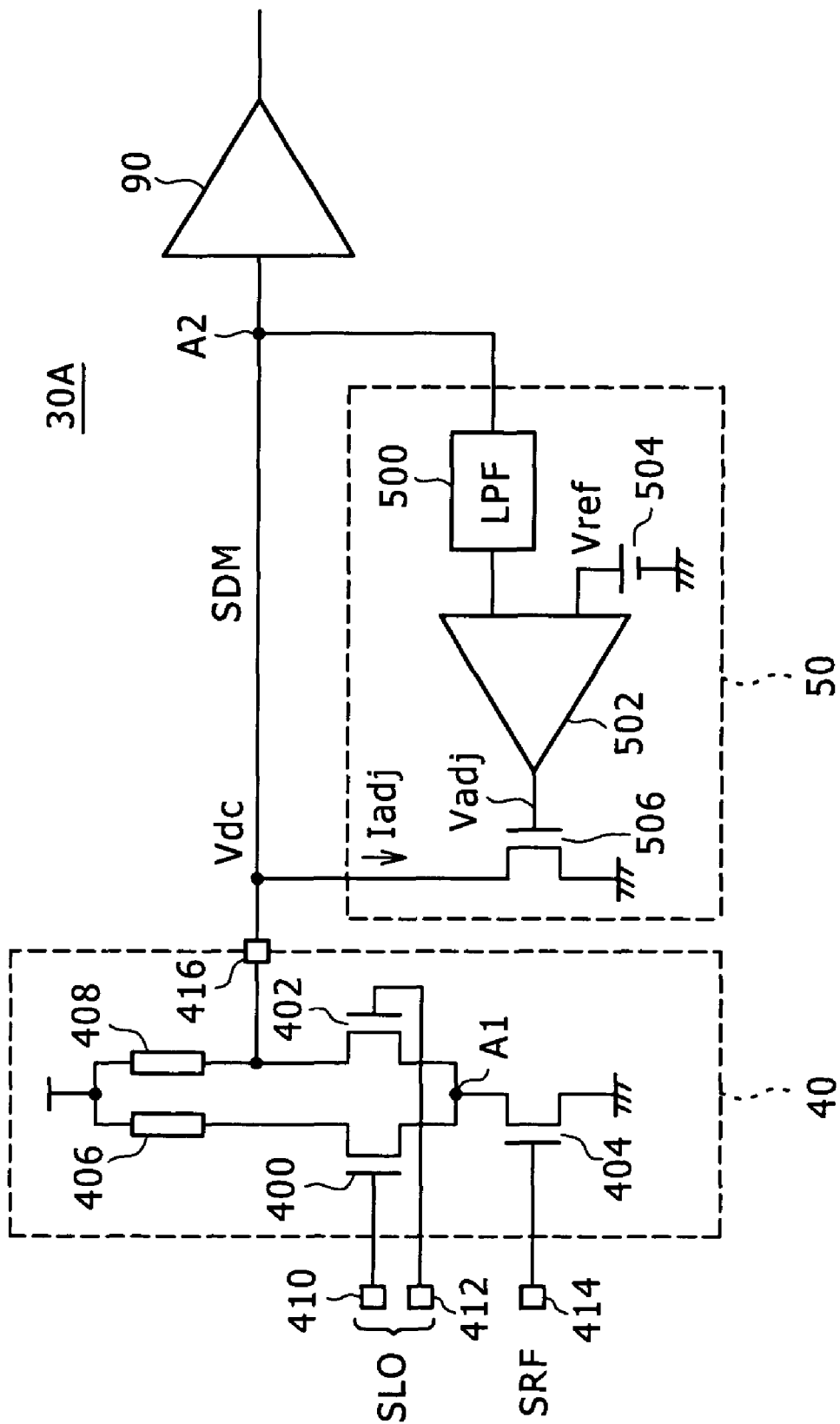
FIG. 3 is a block circuit diagram showing an example of a circuit configuration of a mixer and a DC correction section of a demodulator shown in FIG. 1.

FIG. 3 shows an example of a circuit configuration of the mixer 40 and the DC correction section 50 of the demodulator 30A. Referring to FIG. 3, the mixer 40 includes transistors 400 and 402 of a differential pair, another transistor 404, and a pair of load resistors 406 and 408. In the circuit configuration shown in FIG. 3, an n-type MOSFET (Metal-Oxide-Semiconductor Field-Effect Transistor) is used for the transistors 400, 402 and 404. Also in the second to sixth embodiments of the present invention hereinafter described, an n-type MOSFET is used for various transistors similarly.

The transistor 400 is connected at the drain thereof to the load resistor 406 and at the gate thereof to an input terminal 410 of the mixer 40 connected to the local oscillator 70. The transistor 402 is connected at the drain thereof to the load resistor 408 and an output terminal 416 of the mixer 40 and at the gate thereof to another input terminal 412 of the mixer 40 connected to the local oscillator 70. The sources of the transistors 400 and 402 are connected commonly at a node A1 so as to form a differential pair circuit.

A low-pass filter 500 of the DC correction section 50 and the amplifier 90 are connected to the output terminal 416 of the mixer 40. The transistor 404 is connected at the drain thereof to the source of the transistors 400 and 402 through the node A1 and at the gate thereof to a further input terminal 414 of the mixer which is connected to the amplifier 34. The mixer 40 is grounded at the source thereof. The ground is an example of a power supply of a low potential.

The DC correction section 50 includes a low-pass filter 500, a comparator 502, a power supply 504 of a high potential, and a transistor 506. The low-pass filter 500 is connected at an input terminal thereof to a node A2 provided between the mixer 40 and the amplifier 90 and at an output terminal thereof to one of input terminals of the comparator 502. The comparator 502 is grounded at the other input terminal thereof through the power supply 504. The transistor 506 is connected at the drain thereof to the load resistor 408 through the output terminal 416 of the mixer 40 and at the gate thereof to the output terminal of the comparator 502. The transistor 506 is grounded at the source thereof.

[Example of Operation of the Mixer and the DC Correction Section]

Figure 4A:
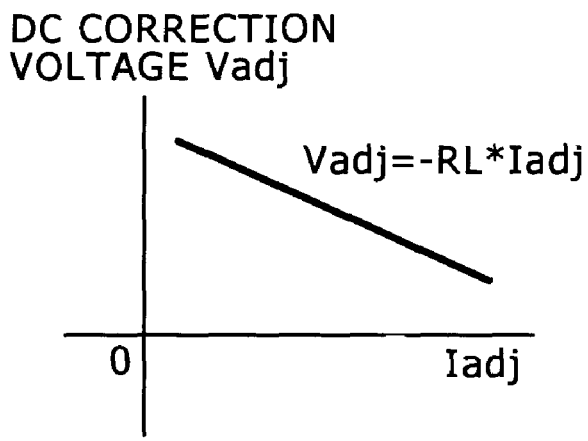
FIG. 4A is a graph illustrating an example of a relationship between drain current and a DC correction amount.
Figure 4B:
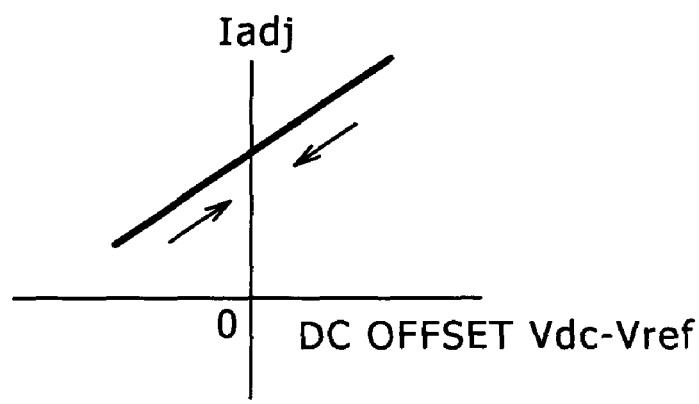
FIG. 4B is a graph illustrating an example of a relationship between drain current and a DC offset.
Figure 4C:
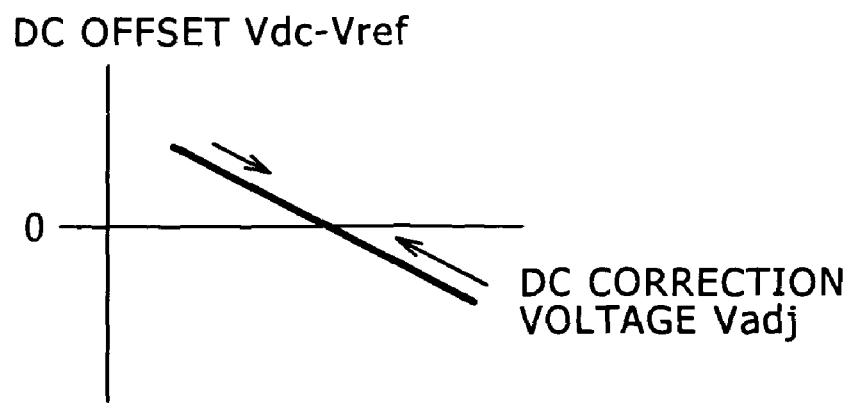
FIG. 4C is a graph illustrating an example of a relationship between a DC correction amount and a DC offset.

An example of operation of the mixer 40 and the DC correction section 50 is described. FIG. 4A is a graph illustrating an example of a relationship between drain current Iadj and a DC correction voltage Vadj, and the axis of ordinate indicates the DC correction voltage and the axis of abscissa indicates the drain current. FIG. 4B is a graph illustrating an example of a relationship between the drain current Iadj and the DC offset, and the axis of ordinate indicates the drain current and the axis of abscissa indicates the DC offset. FIG. 4C is a graph illustrating an example of a relationship between the DC correction voltage Vadj and the DC offset, and the axis of ordinate indicates the DC offset and the axis of abscissa indicates the DC correction voltage.

The local oscillation signal SLO in the form of differential signals is inputted to input terminals 410 and 412 of the transistors 400 and 402, and the modulation signal SRF amplified by the amplifier 34 is inputted to the input terminal 414 of the transistor 404. The mixer 40 multiplies the local oscillation signal SLO and the modulation signal SRF inputted thereto to produce a demodulation signal SDM and outputs the demodulation signal SDM from the load resistor 408 side. The demodulation signal SDM includes a DC component, that is, a DC voltage Vdc, which is produced in response to the phase difference between the local oscillation signal SLO and the modulation signal SRF synchronized in frequency with the local oscillation signal SLO.

The low-pass filter 500 of the DC correction section 50 passes only the DC component of the demodulation signal SDM inputted thereto while intercepting modulation signal components of the demodulation signal SDM. The DC voltage Vdc of the demodulation signal SDM passed through the low-pass filter 500 is inputted to the comparator 502.

The comparator 502 compares the DC voltage Vdc inputted thereto from the low-pass filter 500 and the reference voltage Vref inputted thereto from the power supply 504 with each other and inputs a voltage difference obtained by the comparison as a DC offset to the gate of the transistor 506. The drain current Iadj is fed back to the mixer 40 in accordance with the variation of the DC offset.

In the mixer 40, the amount of the voltage drop by the load resistor 408 varies in response to the variation of the drain current Iadj fed back from the DC correction section 50. Here, the drain current Iadj, DC correction voltage Vadj and load resistor 408 satisfy the following expression (2):

$$Vadj = -RL \times Iadj \qquad (2)$$

Here, the DC correction voltage Vadj is a voltage for correcting the DC voltage Vdc to the reference voltage Vref and signifies a voltage which is produced in response to the DC offset or difference between the reference voltage Vref and the DC voltage Vdc.

If the drain current Iadj increases or decreases, then the DC correction voltage Vadj varies depending upon the variation of the amount of the voltage drop by the load resistor 408 as seen in FIG. 4A, and consequently, the DC voltage Vdc of the demodulation signal SDM can be corrected.

For example, if the DC voltage Vdc of the demodulation signal SDM becomes lower than the reference voltage Vref, then since the DC offset applied to the gate of the transistor 506 decreases, also the drain current Iadj decreases. As the drain current Iadj decreases, the DC correction voltage Vadj increases in the positive direction as seen in FIG. 4A, and consequently, the DC voltage Vdc is automatically controlled toward the reference voltage Vref.

Then, if the drain current Iadj is increased by automatic control thereof so that the DC offset becomes equal to zero as seen in FIG. 4B, then the DC correction voltage Vadj drops correspondingly as seen in FIG. 4C. By feeding back the drain current Iadj to the mixer 40 to carry out the automatic control of the drain current Iadj in this manner, the DC offset can be reduced to zero.

On the other hand, if the DC correction voltage Vadj of the demodulation signal SDM becomes higher than the reference voltage Vref, then the DC offset can be reduced to zero by carrying out a process reverse to that described hereinabove.

As described above, according to the present embodiment, since the DC correction section 50 corrects the DC voltage Vdc of the demodulation signal SDM so as to be equal to the reference voltage Vref, the demodulation operation can be stabilized and a clip can be eliminated to increase the linearity and the output amplitude of the demodulation output. Consequently, performance enhancement of the demodulator 30A can be implemented. Further, in the present embodiment, the DC correction section 50 which detects the DC voltage Vdc of the demodulation signal SDM and controls the DC voltage Vdc so as to be equal to the reference voltage Vref without using a control device of an external circuit is provided in the same chip of the demodulator 30A. Therefore, reduction of the number of pins and the scale of peripheral circuits can be implemented, for example, by mounting all components in the inside of a CMOS circuit, and consequently, reduction of the cost can be implemented.

Second Embodiment

The second embodiment of the present invention is similar to the first embodiment except that demodulation signals SDM1 and SDM2 are extracted from the mixer 40 and the DC voltage of the demodulation signals SDM1 and SDM2 is corrected. It is to be noted that the same components in the demodulator 30A described in the first embodiment as those in the second embodiment are given the same symbols, and detailed description thereof will be omitted.

[Example of the Configuration of the Demodulator]

Figure 5:
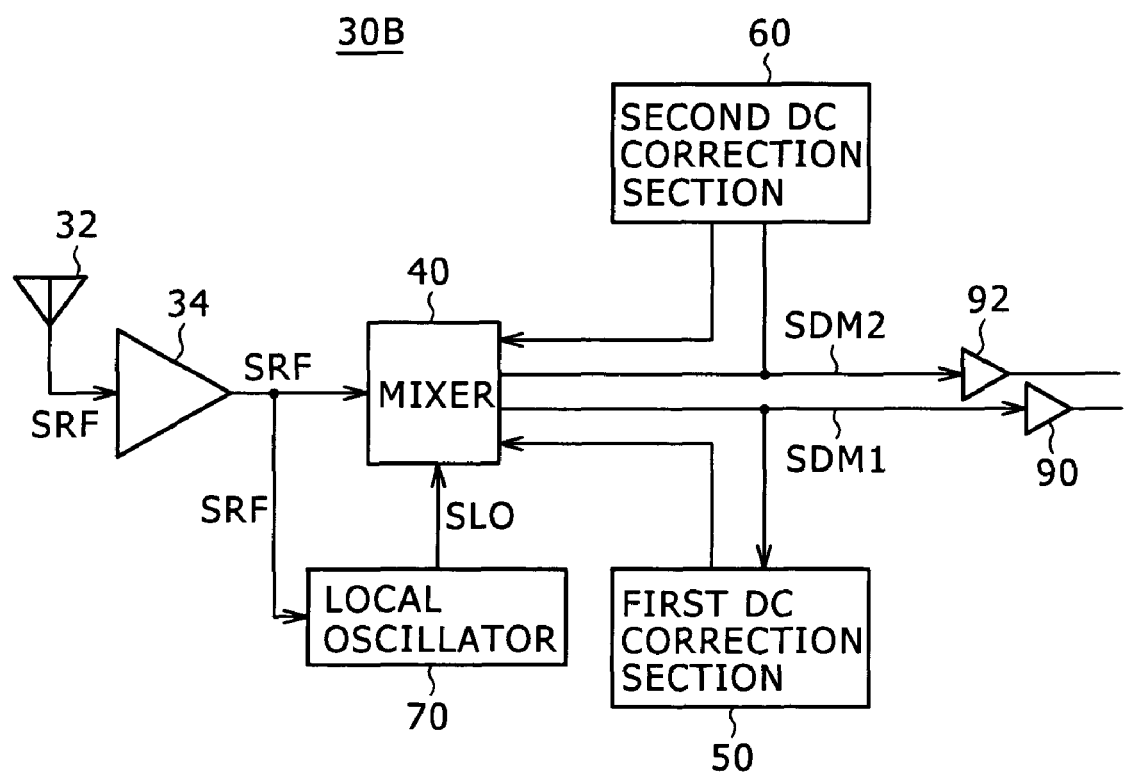
FIG. 5 is a block diagram showing an example of a configuration of a demodulator according to a second embodiment of the present invention.

FIG. 5 shows an example of a block configuration of a demodulator 30B according to the second embodiment. Referring to FIG. 5, the demodulator 30B includes an antenna 32, an amplifier 34 at a preceding stage, a pair of amplifiers 90 and 92 at a succeeding stage, a mixer 40, a local oscillator 70, a first DC correction section 50, and a second DC correction section 60. The second DC correction section 60 corrects a DC voltage Vdc2 (refer to FIG. 6) of the demodulation signal SDM2 extracted from the load resistor 406 side of the mixer 40 to a reference voltage Vref2. It is to be noted that the first DC correction section 50 has a function similar to that of the first DC correction section 50 in the first embodiment, and therefore, overlapping description of the same is omitted herein to avoid redundancy.

Figure 6:
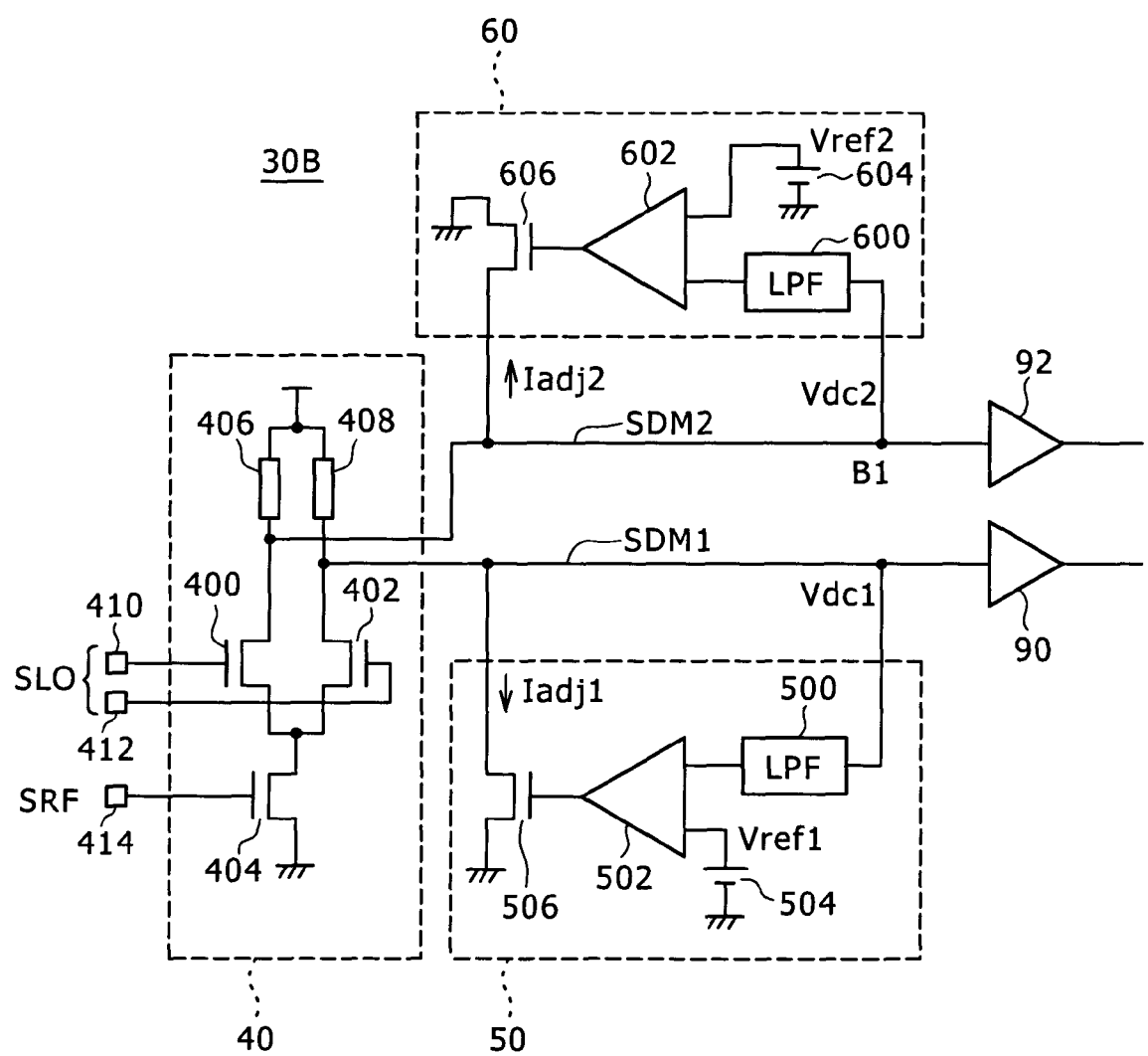
FIG. 6 is a block diagram showing an example of a circuit configuration of a mixer and first and second DC correction sections of the demodulator of FIG. 5.

FIG. 6 shows an example of a circuit configuration of the mixer 40, first DC correction section 50 and second DC correction section 60 of the demodulator 30B. The second DC correction section 60 includes a low-pass filter 600, a comparator 602, a power supply 604, and a transistor 606. The low-pass filter 600 is connected at an input terminal thereof to a node B1 provided between the mixer 40 and the amplifier 92 and at an output terminal thereof to one of input terminals of the comparator 602. The comparator 602 is grounded at the other input terminal thereof through the power supply 604. The transistor 606 is connected at the drain thereof to the load resistor 406 of the mixer 40 and at the gate thereof to the output terminal of the comparator 602. The transistor 606 is grounded at the source thereof.

[Example of Operation of the Demodulator]

The first DC correction section 50 executes operation similar to that of the DC correction section 50 in the first embodiment. In particular, the low-pass filter 500 intercepts modulation signal components of a demodulation signal SDM1 outputted from the load resistor 408 side of the mixer 40 but passes and outputs only the DC voltage Vdc1 of the demodulation signal SDM1 to the comparator 502.

The comparator 502 compares a DC voltage Vdc1 inputted thereto from the low-pass filter 500 and a reference voltage Vref1 inputted thereto from the power supply 504 with each other and inputs a DC offset based on a result of the comparison to the gate of the transistor 506. Consequently, drain current Iadj1 corresponding to a variation of the DC offset is fed back to the mixer 40. In the mixer 40, the amount of the voltage drop by the load resistor 408 varies in response to increase or decrease of the drain current Iadj1 fed back from the first DC correction section 50. Consequently, since a DC correction voltage Vadj1 varies, the DC voltage Vdc1 of the demodulation signal SDM1 is corrected toward the reference voltage Vref1.

The amplifier 90 amplifies and outputs the demodulation signal SDM1 outputted from the mixer 40 and having the corrected DC voltage Vdc1.

The low-pass filter 600 of the second DC correction section 60 intercepts modulation signal components of the demodulation signal SDM2 outputted from the load resistor 406 side of the mixer 40 but passes and outputs only a DC voltage Vdc2 of the demodulation signal SDM2 to the comparator 602. The demodulation signal SDM2 outputted from the load resistor 406 side of the mixer 40 has a phase opposite to that of the demodulation signal SDM1 outputted from the load resistor 408 side.

The comparator 602 compares the DC voltage Vdc2 inputted thereto from the low-pass filter 600 and the reference voltage Vref2 inputted thereto from the power supply 604 with each other and inputs a DC offset based on a result of the comparison to the gate of the transistor 606. Here, the DC offset is a voltage difference between the reference voltage Vref2 and the DC voltage Vdc2. Thus, drain current Iadj2 corresponding to the variation of the DC offset is fed back to the mixer 40.

In the mixer 40, the amount of the voltage drop by the load resistor 406 varies depending upon increase or decrease of the drain current Iadj2 fed back from the second DC correction section 60. Consequently, since a DC correction voltage Vadj2 varies, the DC voltage Vdc2 of the demodulation signal SDM2 can be corrected. Here, the DC correction voltage Vadj2 is a voltage for correcting the DC voltage Vdc2 to the reference voltage Vref2 and signifies a voltage which is produced in accordance with the DC offset or difference between the reference voltage Vref2 and the DC voltage Vdc2.

The amplifier 92 amplifies and outputs the demodulation signal SDM2 outputted from the mixer 40 and having the corrected DC voltage Vdc2.

As described above, according to the present embodiment, differential demodulation outputs can be extracted from the demodulation signal SDM1 outputted from the amplifier 90 and the demodulation signal SDM2 outputted from the amplifier 92. Consequently, since the SN ratio of the demodulation signal can be increased in comparison with that in the first embodiment described hereinabove, transmission over a greater distance can be anticipated.

It is to be noted that the value of the reference voltage Vref2 of the second DC correction section 60 is not limited to the value equal to that of the reference voltage Vref1 of the first DC correction section 50 but can be set arbitrarily within a range of operation of the amplifier 92. Further, while, in the example described above, the amplifiers 90 and 92 are formed as independent components, even if they are formed otherwise as a single unified differential amplifier, a similar effect can be achieved.

Third Embodiment

The third embodiment is similar to the first embodiment described hereinabove except that differential demodulation signals SDM1 and SDM2 of opposite outputs are extracted from the mixer 40 and the DC voltage of the demodulation signals SDM1 and SDM2 is corrected. It is to be noted that the same components in the demodulator 30A described in the first embodiment as those in the third embodiment are given the same symbols, and detailed description thereof will be omitted.

[Example of the Configuration of the Demodulator]

Figure 7:
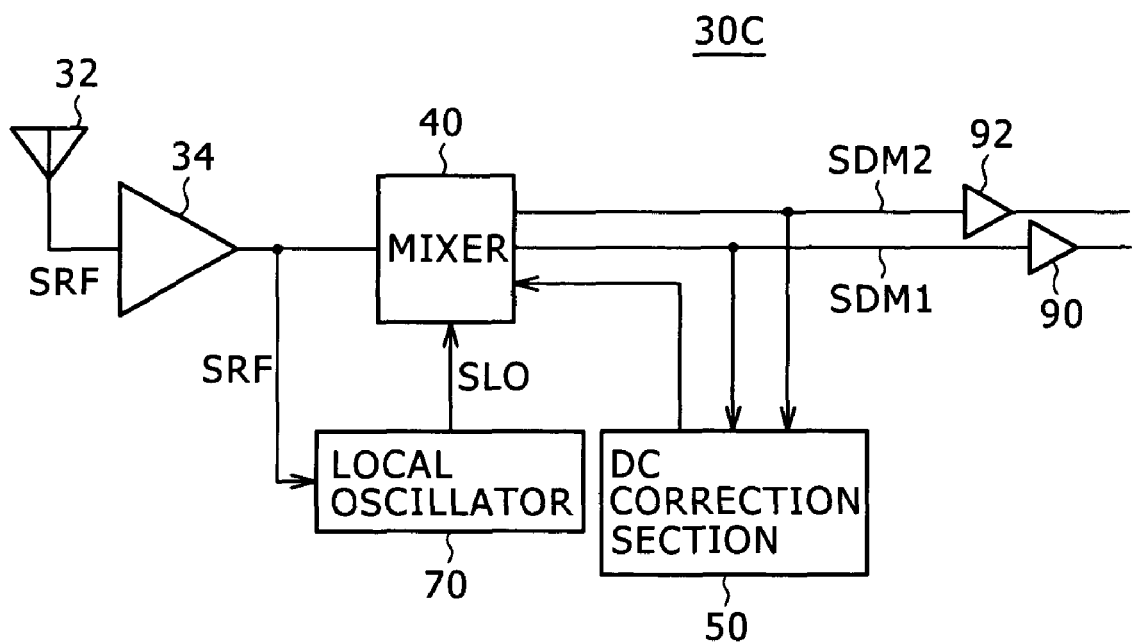
FIG. 7 is a block diagram showing an example of a configuration of a demodulator according to a third embodiment of the present invention.

FIG. 7 shows an example of a block configuration of the demodulator 30C according to the third embodiment of the present invention. Referring to FIG. 7, the demodulator 30C includes an antenna 32, an amplifier 34 at a preceding stage, amplifiers 90 and 92 at a succeeding stage, a mixer 40, a local oscillator 70 and a DC correction section 50.

Figure 8:
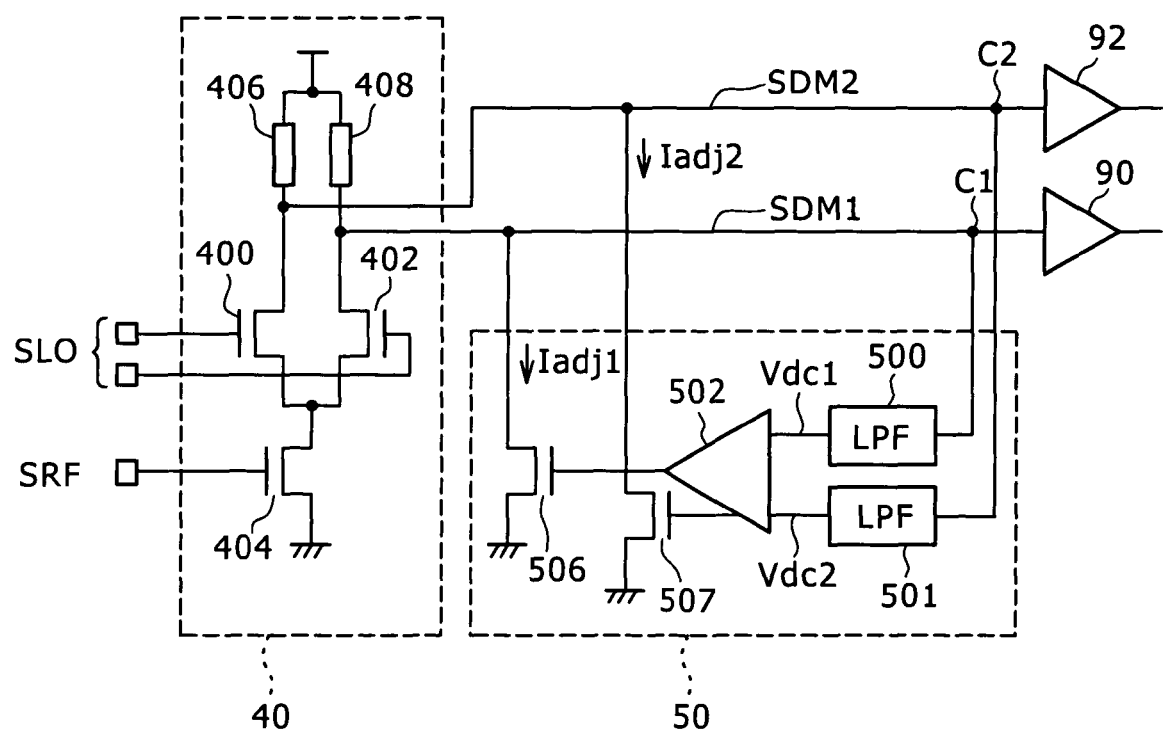
FIG. 8 is a block diagram showing an example of a circuit configuration of a mixer and a DC correction section of the demodulator of FIG. 7.

FIG. 8 shows an example of a circuit configuration of the demodulator 30C. Referring to FIG. 8, the DC correction section 50 includes a first low-pass filter 500, a second low-pass filter 501, a comparator 502, and transistors 506 and 507. The first low-pass filter 500 is connected at an input terminal thereof to a node C1 provided between the load resistor 408 and the amplifier 90 of the mixer 40 and at an output terminal thereof to one of input terminals of the comparator 502. The second low-pass filter 501 is connected at an input terminal thereof to a node C2 provided between the load resistor 406 and the amplifier 92 of the mixer 40 and at an output terminal thereof to the other input terminal of the comparator 502.

The comparator 502 is connected at one of output terminals thereof to the gate of the transistor 506 and at the other output terminal thereof to the gate of the transistor 507. The transistor 506 is connected at the drain thereof to the load resistor 408 and grounded at the source thereof. The transistor 507 is connected at the drain thereof to the load resistor 406 and grounded at the source thereof.

[Example of Operation of the Demodulator]

The first low-pass filter 500 of the DC correction section 50 intercepts modulation signal components of the demodulation signal SDM1 outputted from the load resistor 408 side of the mixer 40 but passes and outputs only the DC voltage Vdc1 of the demodulation signal SDM1 to the comparator 502. The second low-pass filter 501 intercepts modulation signal components of the demodulation signal SDM2 outputted from the load resistor 406 side of the mixer 40 but passes and outputs only the DC voltage Vdc2 of the demodulation signal SDM2. Here, the demodulation signal SDM2 outputted from the load resistor 406 side of the mixer 40 has a phase opposite to that of the demodulation signal SDM1 outputted from the load resistor 408 side.

The comparator 502 compares the DC voltage Vdc1 of the demodulation signal SDM1 and the DC voltage Vdc2 of the demodulation signal SDM2 inputted thereto with each other and inputs a voltage difference obtained from a result of the comparison as a DC offset to the gate of the transistors 506 and 507. Consequently, drain current Iadj1 and Iadj2 corresponding to the DC offset is fed back to the mixer 40. In the mixer 40, the amount of the voltage drop by the load resistor 408 varies in response to increase or decrease of the drain current Iadj1 fed back from the DC correction section 50, and the amount of the voltage drop by the load resistor 406 varies in response to increase or decrease of the drain current Iadj2. Consequently, the DC correction voltages Vadj1 and Vadj2 vary as seen in FIG. 4A, and the DC voltage Vdc1 of the demodulation signal SDM1 and the DC voltage Vdc2 of the demodulation signal SDM2 are corrected so that the voltage difference between the DC voltage Vdc1 and the DC voltage Vdc2 may be minimized to zero.

The demodulation signal SDM1 having the corrected DC voltage Vdc1 is amplified by and outputted from the amplifier 90. Meanwhile, the demodulation signal SDM2 having the DC voltage Vdc2 is amplified by and outputted from the amplifier 92.

As described above, according to the present embodiment, differential demodulation outputs whose DC component is corrected can be extracted from the demodulation signal SDM1 outputted from the amplifier 90 and the demodulation signal SDM2 outputted from the amplifier 92. Consequently, since the SN ratio of the demodulation signal can be increased in comparison with that in the first embodiment described hereinabove, transmission over a greater distance can be anticipated. Further, since the comparator 502 uses the demodulation signals SDM1 and SDM2 of a differential pair, the necessity to provide the reference voltage Vref from some other element is eliminated, and consequently, reduction of the circuit scale can be achieved.

While, in the example described above, the amplifiers 90 and 92 are formed as independent components, even if they are formed otherwise as a single unified differential amplifier, a similar effect can be achieved. Further, similar operation can be achieved even if DC observation points for inputting to the first and second low-pass filters 500 and 501 are provide by the amplifiers 90 and 92.

Fourth Embodiment

Figure 12A:
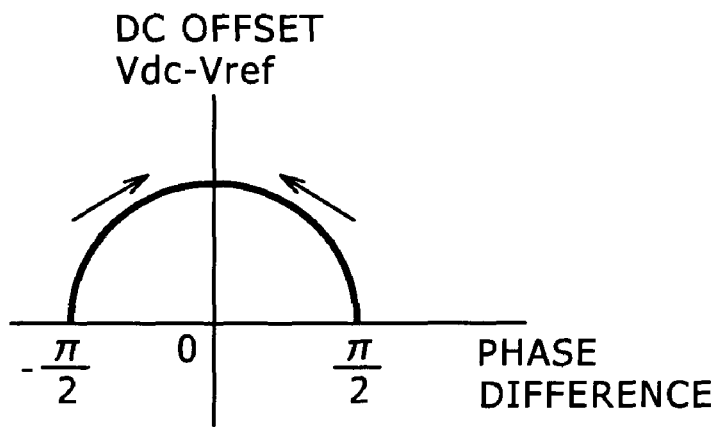
FIG. 12A is a graph illustrating an example of a relationship between a DC offset and a phase difference.
Figure 12B:
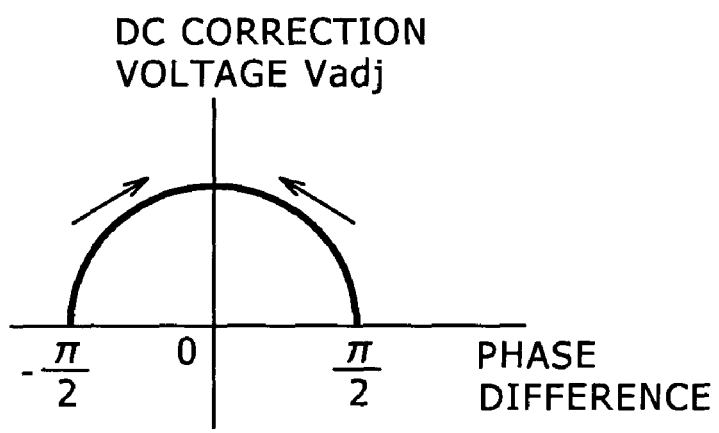
FIG. 12B is a graph illustrating an example of a relationship between a DC correction voltage and a phase difference.

In the following, a fourth embodiment of the present invention is described with reference to the drawings. As described hereinabove in connection with the first embodiment, when the local oscillation signal SLO and the injection signal SRF are synchronized in phase with each other, the DC voltage Vdc indicates a maximum value and also the DC correction voltage Vadj indicates a maximum value as seen in FIG. 12B. On the other hand, in the fourth embodiment, the phase synchronization between the modulation signal SFR and the local oscillation signal SLO is controlled by adjusting the DC correction voltage Vadj. It is to be noted that the same components in the demodulator 30A described in the first embodiment as those in the fourth embodiment are given the same symbols, and detailed description thereof will be omitted.
[Example of the Configuration of the Demodulator]

Figure 9:
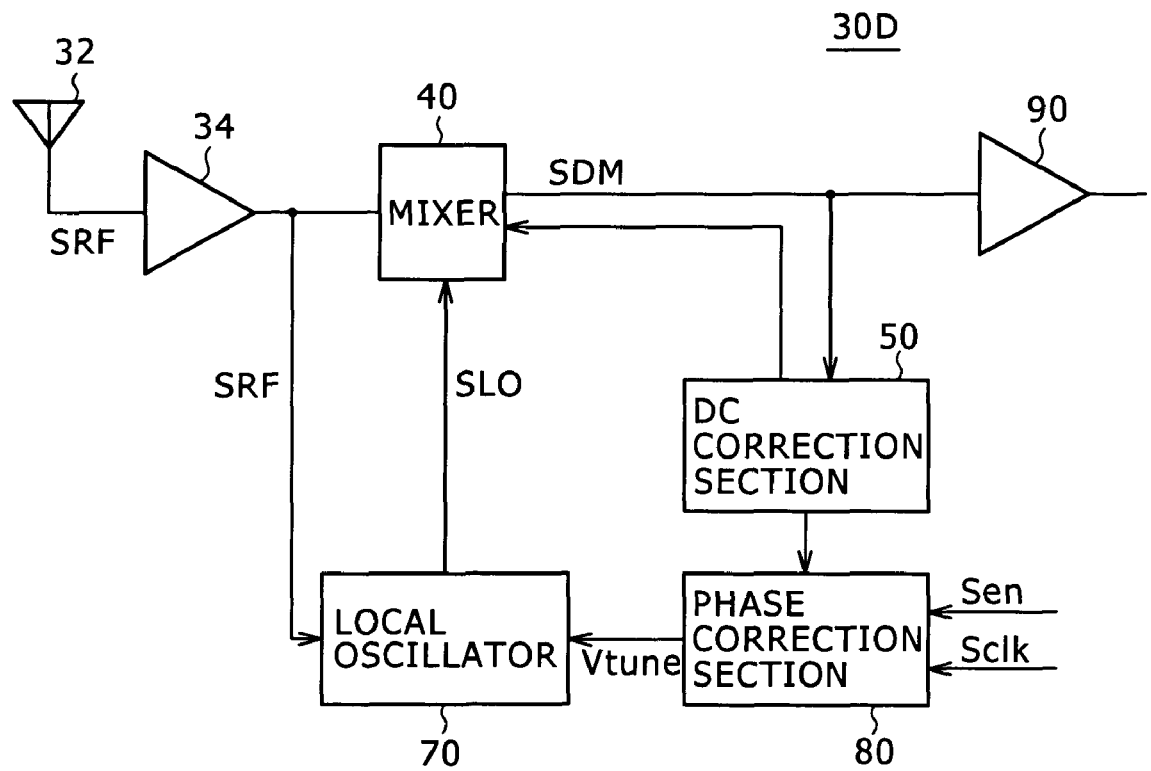
FIG. 9 is a block diagram showing an example of a configuration of a demodulator according to a fourth embodiment of the present invention.

FIG. 9 shows an example of a configuration of the demodulator 30D according to the fourth embodiment of the present invention. Referring to FIG. 9, the demodulator 30D includes an antenna 32, amplifiers 34 and 90, a mixer 40, a local oscillator 70, a DC correction section 50 and a phase correction section 80. The demodulator 30D has a phase correction mode in which phase synchronization between the modulation signal SRF and the local oscillation signal SLO is carried out. The phase correction mode is provided separately in time from a DC voltage correction mode in which correction of the DC voltage Vdc of the demodulation signal SDM described hereinabove is carried out.

The phase correction can be carried out at various timings such as when the power supply is made available, upon restoration from a standby mode, upon change of a communication setting such as a channel, at the top of a packet and at any intermediate point of a packet where the packet is long. At any of the timings, an enable signal Sen is set to the high level to start up the phase correction section 80. If the mode of the demodulator 30D is changed over to the phase synchronization mode, then the phase correction section 80 sets the phase of the local oscillation signal SLO to an optimum phase based on the DC correction voltage Vadj produced by the DC correction section 50.

Figure 10:
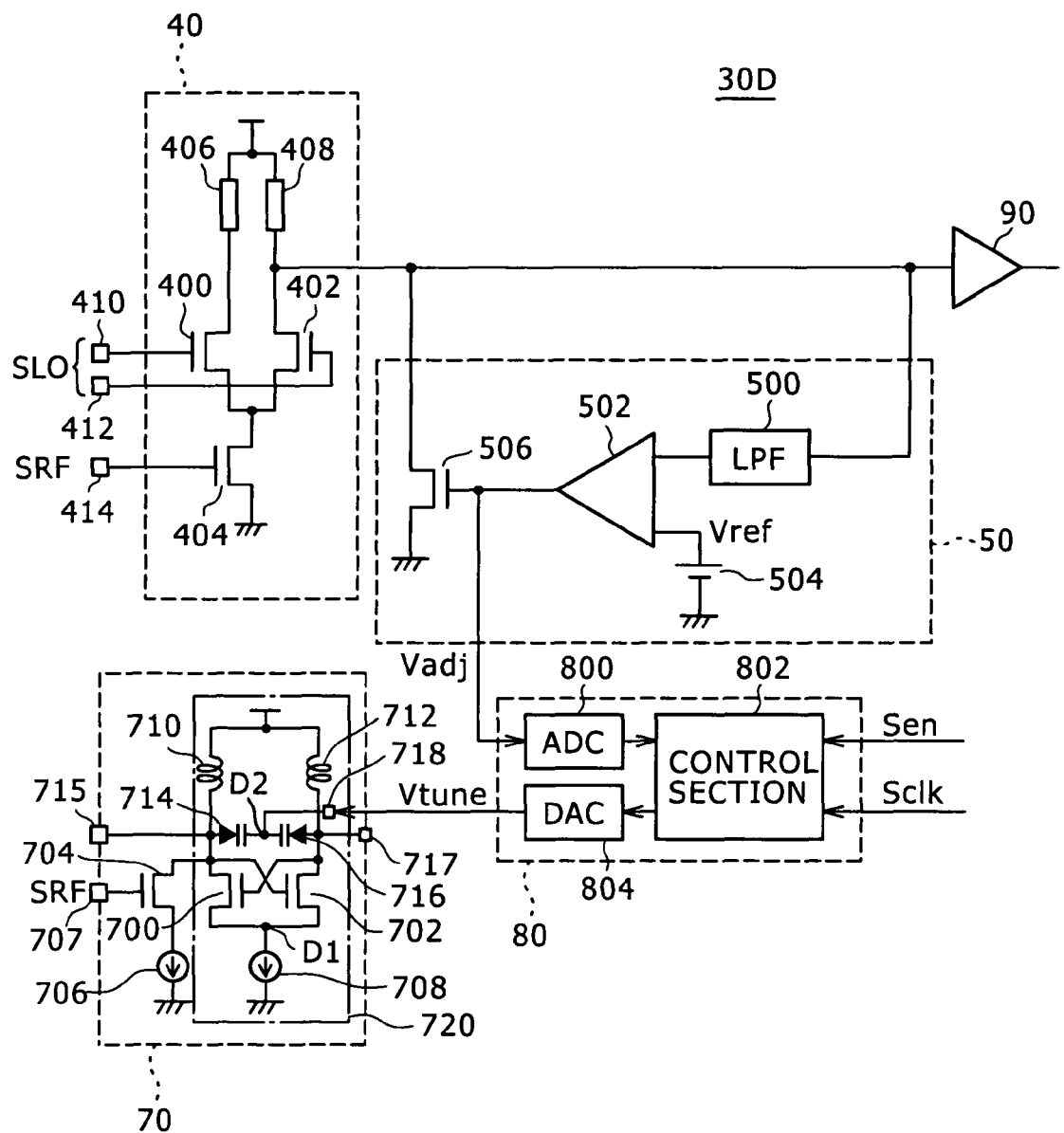
FIG. 10 is a block diagram showing an example of a circuit configuration of a mixer, a DC correction section, a phase correction section and a local oscillator of the demodulator of FIG. 9.

FIG. 10 shows an example of a circuit configuration of the mixer 40, DC correction section 50, phase correction section 80 and local oscillator 70. Referring to FIG. 10, the phase correction section 80 includes an A/D conversion section 800, a control section 802, and a D/A conversion section 804. The A/D conversion section 800 is connected at an input terminal thereof to the output terminal of the comparator 502 of the DC correction section 50 and at an output terminal thereof to the control section 802. The A/D conversion section 800 converts the DC correction voltage Vadj supplied thereto from the DC correction section 50 into a digital signal and supplies the digital signal to the control section 802.

The control section 802 includes, for example, a CPU (Central Processing Unit), a ROM (Read Only Memory) and a RAM (Random Access Memory). The control section 802 produces a phase correction signal Vtune for adjusting the frequency or the phase of the local oscillation signal SLO based on the DC correction voltage Vadj in the form of a digital signal supplied thereto from the A/D conversion section 800 and supplies the phase correction signal Vtune to the D/A conversion section 804.

The D/A conversion section 804 is connected at an output terminal thereof to an input terminal 718 of the local oscillator 70, and converts the phase correction signal Vtune supplied thereto from the control section 802 into an analog signal and supplies the analog signal to the local oscillator 70.

The local oscillator 70 includes an oscillation circuit 720 of the cross couple type and a transistor 704 to which the injection signal SRF is inputted. The oscillation circuit 720 includes transistors 700 and 702, a current source 708, inductors 710 and 712, and variable-capacitance diodes 714 and 716.

The sources of the transistors 700 and 702 are connected commonly through a node D1, and the current source 708 is interposed between the node D1 and the ground. The transistor 700 is connected at the drain thereof to the drain of the transistor 704, an output terminal 715 of the local oscillator 70 and the gate of the transistor 702. Further, the transistor 700 is connected at the drain thereof to one of terminals of the inductor 710 and one of terminals of the variable-capacitance diode 714.

The transistor 702 is connected at the drain thereof to another output terminal 717 of the local oscillator 70 and the gate of the transistor 700. The transistor 702 is connected at the drain thereof to one of terminals of the inductor 712 and one of terminals of the variable-capacitance diode 716.

The other terminals of the variable-capacitance diodes 714 and 716 are connected commonly through a node D2, and a D/A conversion section 804 of the phase correction section 80 is connected to the node D2 through an input terminal 718 of the local oscillator 70. The other terminals of the inductors 710 and 712 are connected to a power supply Vcc. In the present example, an LC resonator is formed from the inductors 710 and 712 and the variable-capacitance diodes 714 and 716.

The transistor 704 is connected at the drain thereof to the drain of the transistor 700, the gate of the transistor 702, one of terminals of the inductor 710 and one of terminals of the variable-capacitance diode 714. Further, the transistor 704 is connected at the gate thereof to the amplifier 34 through the output terminal 717 and grounded at the source thereof to a current source 706.

The capacitance of the variable-capacitance diodes 714 and 716 of the local oscillator 70 configured in such a manner as described above is determined by the phase correction signal Vtune inputted from the D/A conversion section 804 of the phase correction section 80 and the inductors 710 and 712. Therefore, since the inductors 710 and 712 are fixed, the resonance frequency, that is, the self-running oscillation frequency, of the local oscillation signals SLO is determined in accordance with the phase correction signal Vtune.

To the gate of the transistor 704, the injection signal SRF transmitted from the modulator 10 side through an input terminal 707 of the local oscillator 70 is inputted, and a voltage variation of the modulation signal SRF is converted into a current variation and injected into the oscillation circuit 720. Consequently, the frequency of the local oscillation signals SLO produced by the oscillation circuit 720 is synchronized with the frequency of the injection signal SRF and outputted from the output terminals 715 and 717. The local oscillation signals SLO of the opposite phases outputted from the output terminals 715 and 717 are inputted to the input terminals 410 and 412 of the mixer 40, respectively.

[Example of Operation of the Demodulator]

Figure 12C:
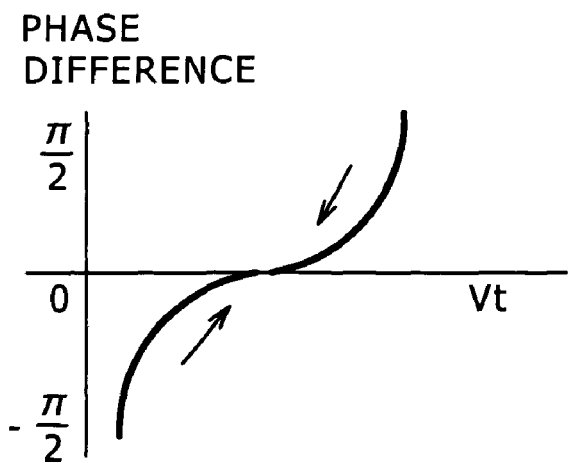
FIG. 12C is a graph illustrating an example of a relationship between a phase correction signal and a phase difference.

Now, an example of control where phase synchronization of the local oscillation signals SLO and the modulation signal SRF is carried out is described. FIGS. 11A to 11F illustrate an example of operation of the DC correction section 50 and the phase correction section 80. FIG. 12A illustrates an example of a relationship between the DC offset and the phase difference, and the axis of ordinate indicates the DC offset and the axis of abscissa indicates the phase difference. FIG. 12B illustrates an example of a relationship between the DC correction voltage Vadj and the phase difference, and the axis of ordinate indicates the DC correction voltage and the axis of abscissa indicates the phase difference. FIG. 12C illustrates an example of a relationship between the phase correction signal Vtune and the phase difference, and the axis of ordinate indicates the phase difference and the axis of abscissa indicates the output level of the phase correction signal.

To the control section 802 of the phase correction section 80, the enable signal Sen and a clock signal Sclk are inputted from a clock control section not shown as seen in FIGS. 11A and 11B. The control section 802 produces and outputs a phase correction signal Vtune whose amplitude varies stepwise to the D/A conversion section 804 at a timing of a rising edge of the clock signal Sclk when the enable signal Sen has the high level as seen in FIG. 11C. In the present example, the amplitude level of the phase correction signal Vtune increases stepwise.

The local oscillator 70 produces local oscillation signals SLO synchronized in phase with the modulation signal SRF based on the injection signal SRF inputted thereto from the phase correction section 80 and the injection signal SRF transmitted thereto from the modulator 10 and outputs the produced local oscillation signals SLO to the mixer 40. The local oscillation signals SLO vary stepwise in phase or the like in response to the variation of the phase correction signal Vtune.

The mixer 40 multiplies the local oscillation signals SLO supplied thereto from the local oscillator 70 and the modulation signal SRF transmitted thereto from the modulator 10 side to produce a demodulation signal SDM. At this time, a phase difference is produced between the local oscillation signals SLO, which vary stepwise, and the modulation signal SRF, and also the DC voltage Vdc of the demodulation signal SDM varies together with the phase difference as seen from FIG. 11D. In the present example, when the amplitude level of the phase correction signal Vtune is such as a portion of the diagram surrounded by a solid line circle in FIG. 11C, the local oscillation signals SLO and the modulation signal SRF are synchronized in phase with each other, and the DC voltage Vdc of the demodulation signal SDM indicates a maximum value.

The DC correction section 50 produces the DC correction voltage Vadj in accordance with the variation of the DC voltage Vdc with which the DC voltage Vdc of the demodulation signal SDM becomes equal to the reference voltage Vref as described hereinabove as seen in FIG. 11E. The DC correction voltage Vadj produced by the DC correction section 50 is supplied to the phase correction section 80.

The control section 802 of the phase correction section 80 fetches the DC correction voltage Vadj at a timing of a falling edge of the clock signal Sclk and stores the fetched DC correction voltage Vadj in an associated relationship with the corresponding phase correction signal Vtune into a storage section such as a RAM. Such a sequence of operations as described above are carried out repetitively till a timing at which the enable signal Sen falls.

The control section 802 selects a DC correction voltage with which the value of the DC correction voltage Vadj becomes maximum from among a plurality of DC correction voltages Vadj stored in the storage section at a timing of a falling edge of the enable signal Sen. Then, the control section 802 reads out a phase correction signal Vtune corresponding to the selected DC correction voltage Vadj from the storage section and outputs the phase correction signal Vtune to the D/A conversion section 804. In the present example, since the DC correction voltage Vadj indicates a maximum value within the region surrounded by a solid line in FIG. 11E, the control section 802 reads out the phase correction signal Vtune corresponding to the DC correction voltage Vadj then, that is, within the region surrounded by the solid line in FIG. 11C, and outputs the phase correction signal Vtune to the D/A conversion section 804.

As described above, according to the present embodiment, by selecting a maximum DC correction voltage Vadj, a voltage when the DC voltage Vdc of the demodulation signal SDM exhibits a maximum value can be selected. Consequently, as seen in FIGS. 12A to 12C, the phase difference between the local oscillation signals SLO and the modulation signal SRF becomes minimum when the DC voltage Vdc, that is, the DC correction voltage Vadj, indicates a maximum value. Therefore, phase synchronization of the local oscillation signals SLO and the injection signal SRF can be carried out with a high degree of accuracy. It is to be noted that the phase correction operation is not limited to the controlling method described above.

Fifth Embodiment

The fifth embodiment is similar to the fourth embodiment described hereinabove except that demodulation signals SDM1 and SDM2 of differential outputs are extracted from the mixer 40 to adjust the phase of the local oscillation signal SLO. It is to be noted that the same components in the demodulator 30D described in the fourth embodiment as those in the fifth embodiment are given the same symbols, and detailed description thereof will be omitted. Further, the first and second DC correction sections 50 and 60 have a configuration and functions similar to those of the first and second DC correction sections 50 and 60 described hereinabove in the second embodiment, respectively. Therefore detailed description thereof will be skipped.

[Example of the Configuration of the Demodulator]

Figure 13:
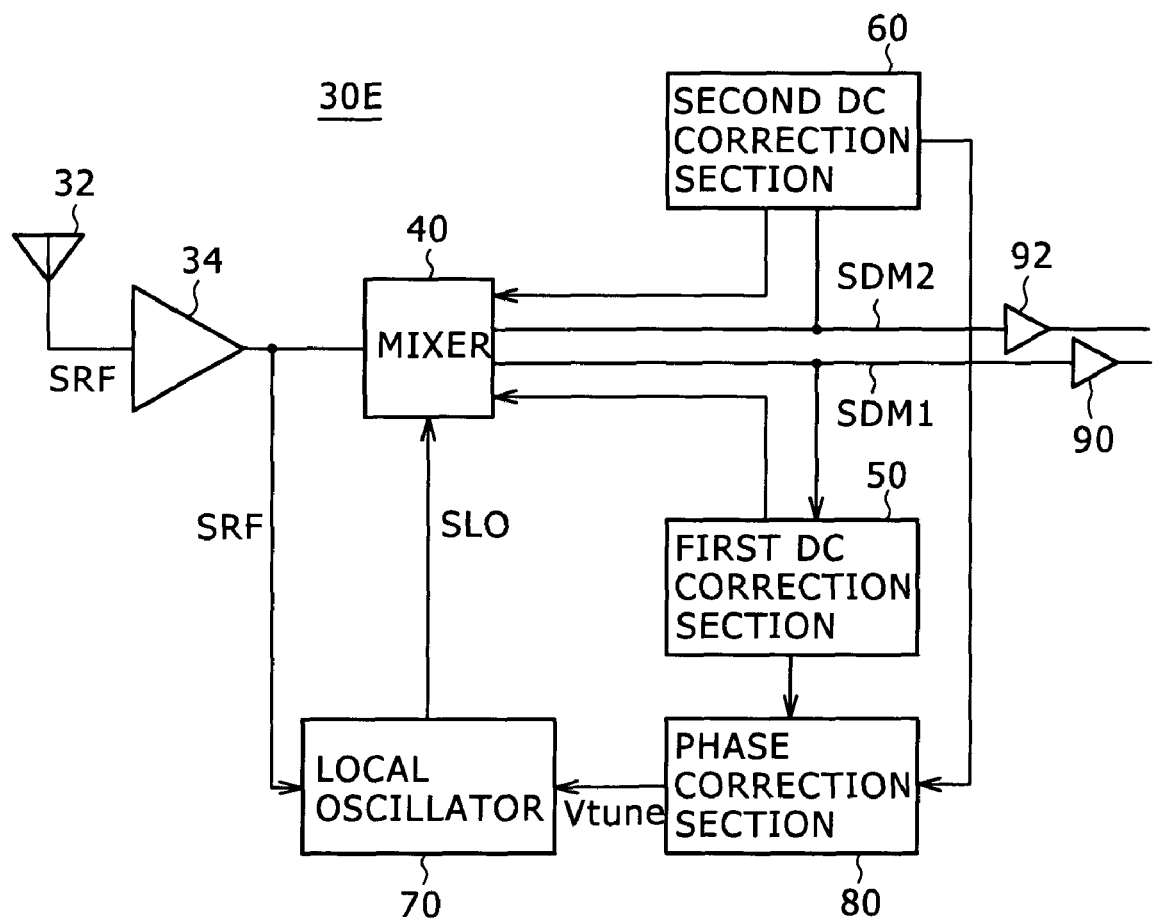
FIG. 13 is a block diagram showing an example of a configuration of a demodulator according to a fifth embodiment of the present invention.

FIG. 13 shows an example of a block configuration of the demodulator 30E according to the fifth embodiment of the present invention. Referring to FIG. 13, the demodulator 30E includes an antenna 32, an amplifier 34 at a preceding stage, amplifiers 90 and 92 at a succeeding stage, a mixer 40, a local oscillator 70, a first DC correction section 50, a second DC correction section 60 and a phase correction section 80.

Figure 14:
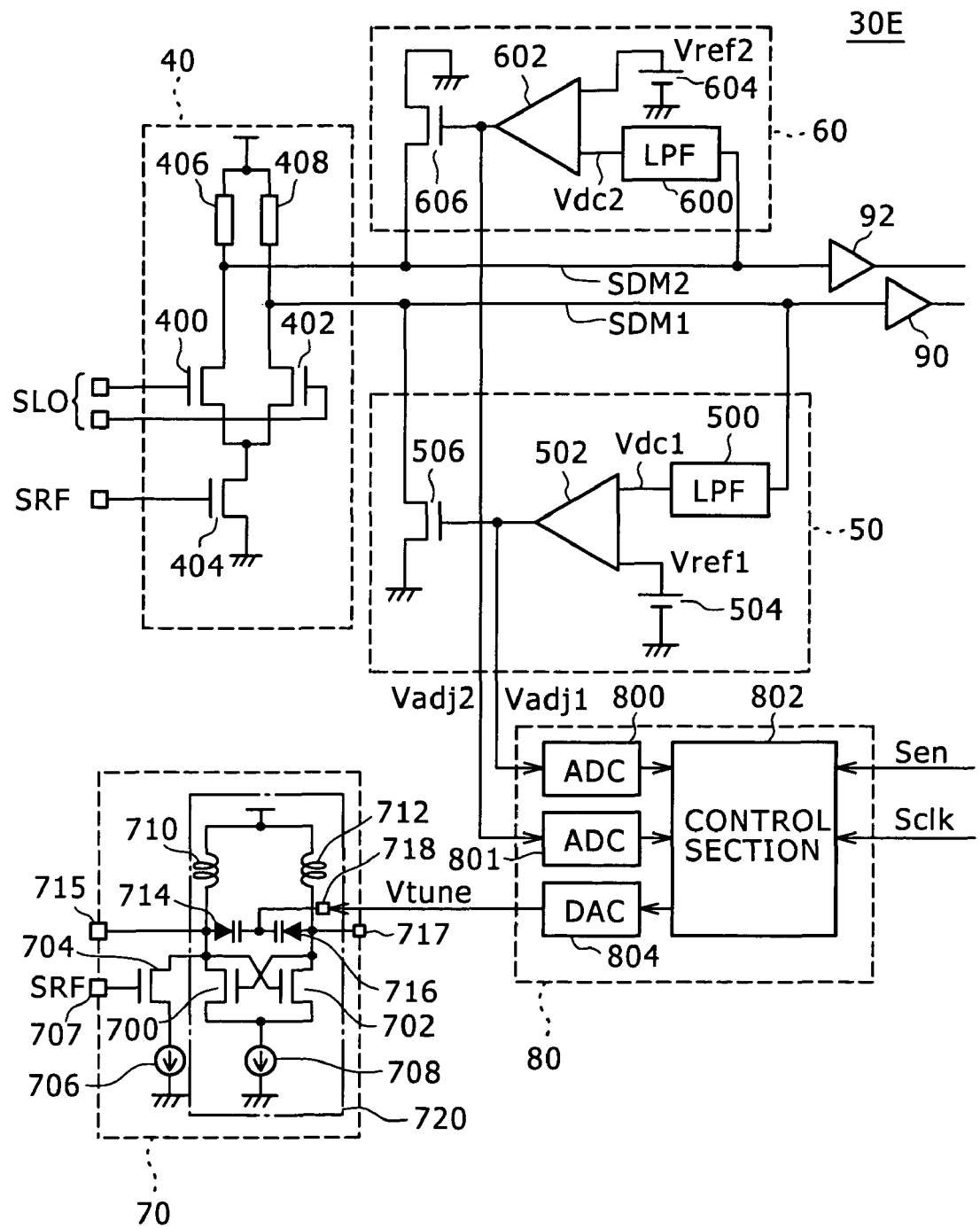
FIG. 14 is a block diagram showing an example of a circuit configuration of a mixer, a DC correction section, a phase correction section and a local oscillator of the demodulator of FIG. 13.

FIG. 14 shows an example of a circuit configuration of the demodulator 30E. Referring to FIG. 14, the phase correction section 80 includes a first A/D conversion section 800, a second A/D conversion section 801, a control section 802 and a D/A conversion section 804. The first A/D conversion section 800 is connected at an input terminal thereof to the output terminal of the comparator 502 of the first DC correction section 50 and at an output terminal thereof to the control section 802. The second A/D conversion section 801 is connected at an input terminal thereof to the output terminal of the comparator 602 of the second DC correction section 60 and at an output terminal thereof to the control section 802.

[Example of Operation of the Demodulator]

To the control section 802 of the phase correction section 80, the enable signal. Sen and the clock signal Sclk are inputted from the clock controlling section not shown. The control section 802 of the phase correction section 80 produces a phase correction signal Vtune whose amplitude level varies stepwise based on the enable signal Sen and the clock signal Sclk inputted thereto and outputs the phase correction signal Vtune to the D/A conversion section 804 as seen in FIG. 11C.

The local oscillator 70 produces local oscillation signals SLO based on the phase correction signal Vtune inputted thereto from the phase correction section 80 and the injection signal SRF transmitted thereto from the modulator 10 side and outputs the local oscillation signals SLO to the mixer 40. The mixer 40 multiplies the local oscillation signals SLO received from the local oscillator 70 and the injection signal SRF received from the modulator 10 side to produce demodulation signals SDM1 and SDM2 and differentially outputs the demodulation signals SDM1 and SDM2. The demodulation signal SDM1 is extracted from the load resistor 408 side and inputted to the first DC correction section 50. The demodulation signal SDM2 is extracted from the load resistor 406 side and inputted to the second DC correction section 60.

The first DC correction section 50 produces a DC correction voltage Vadj1 with which the DC voltage Vdc1 of the demodulation signal SDM1 becomes the reference voltage Vref1 as described hereinabove as seen in FIG. 11E and inputs the DC correction voltage Vadj1 to the first A/D conversion section 800 of the phase correction section 80. The first A/D conversion section 800 converts the DC correction voltage Vadj1 into a digital value and supplies the digital value to the control section 802.

The second DC correction section 60 produces a DC correction voltage Vadj2 with which the DC voltage Vdc2 of the demodulation signal SDM2 becomes the reference voltage Vref2 and inputs the DC correction voltage Vadj2 to the second A/D conversion section 801 of the phase correction section 80. The second A/D conversion section 801 converts the DC correction voltage Vadj2 into a digital value and supplies the digital value to the control section 802.

The control section 802 selects the phase correction signal Vtune when the voltage difference between the DC correction voltages Vadj1 and Vadj2 differentially inputted thereto becomes maximum and outputs the selected phase correction signal Vtune to the D/A conversion section 804 as seen in FIG. 11C. The D/A conversion section 804 converts the phase correction signal Vtune into an analog signal and inputs the analog signal to the local oscillator 70. Consequently, the local oscillator 70 can produce local oscillation signals SLO having a phase synchronized with that of the injection signal SRF and output the local oscillation signals SLO to the mixer 40.

As described above, according to the present embodiment, since the DC correction voltages Vadj1 and Vadj2 can be detected differentially by the first and second DC correction sections 50 and 60, the SN ratio can be increased, and consequently, further stabilized phase correction can be carried out.

Sixth Embodiment

The sixth embodiment is similar to fourth embodiment described hereinabove except that differential outputs are extracted from the mixer 40 to adjust the phase of the local oscillation signals SLO. It is to be noted that common components to those of the demodulators 30A and 30C such as the DC correction section 50 described hereinabove in connection with the first and third embodiments are denoted by like reference symbols, and overlapping description of them is omitted herein to avoid redundancy.

[Example of the Configuration of the Demodulator]

Figure 15:
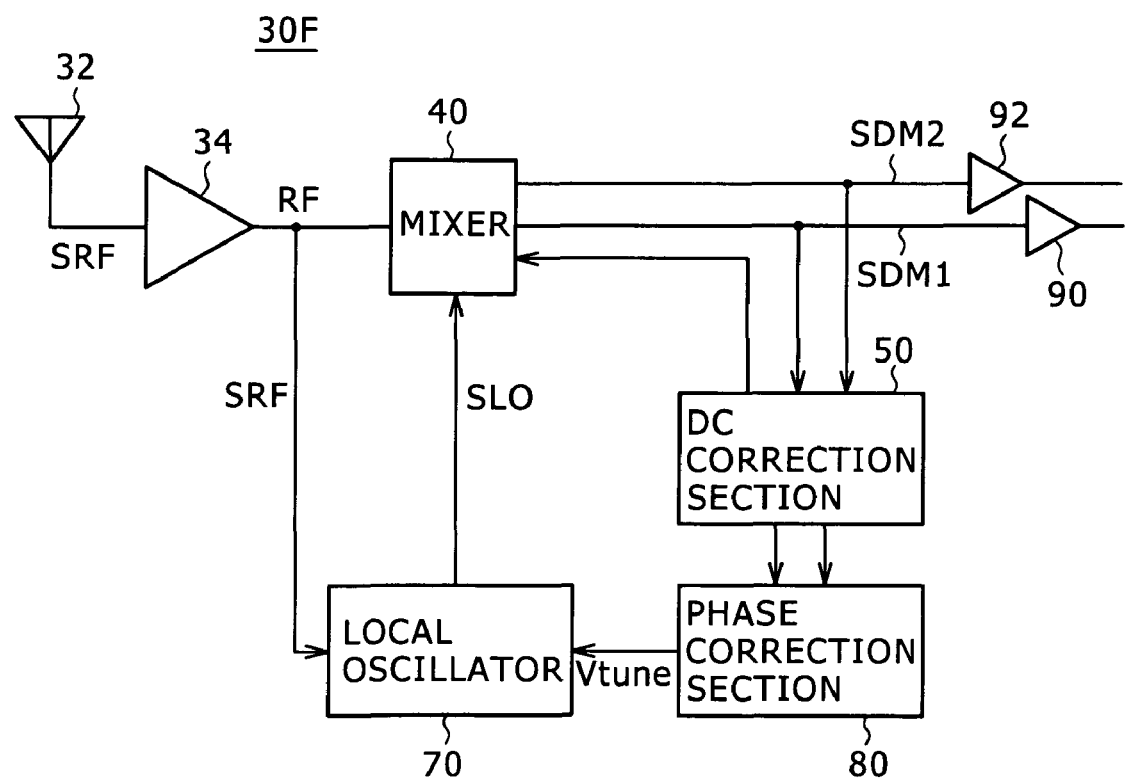
FIG. 15 is a block diagram showing an example of a configuration of a demodulator according to a sixth embodiment of the present invention.

FIG. 15 shows an example of a block configuration of the demodulator 30F in the sixth embodiment. The demodulator 30F includes an antenna 32, an amplifier 34 at a preceding stage, amplifiers 90 and 92 at a succeeding stage, a mixer 40, a local oscillator 70, a DC correction section 50 and a phase correction section 80.

Figure 16:
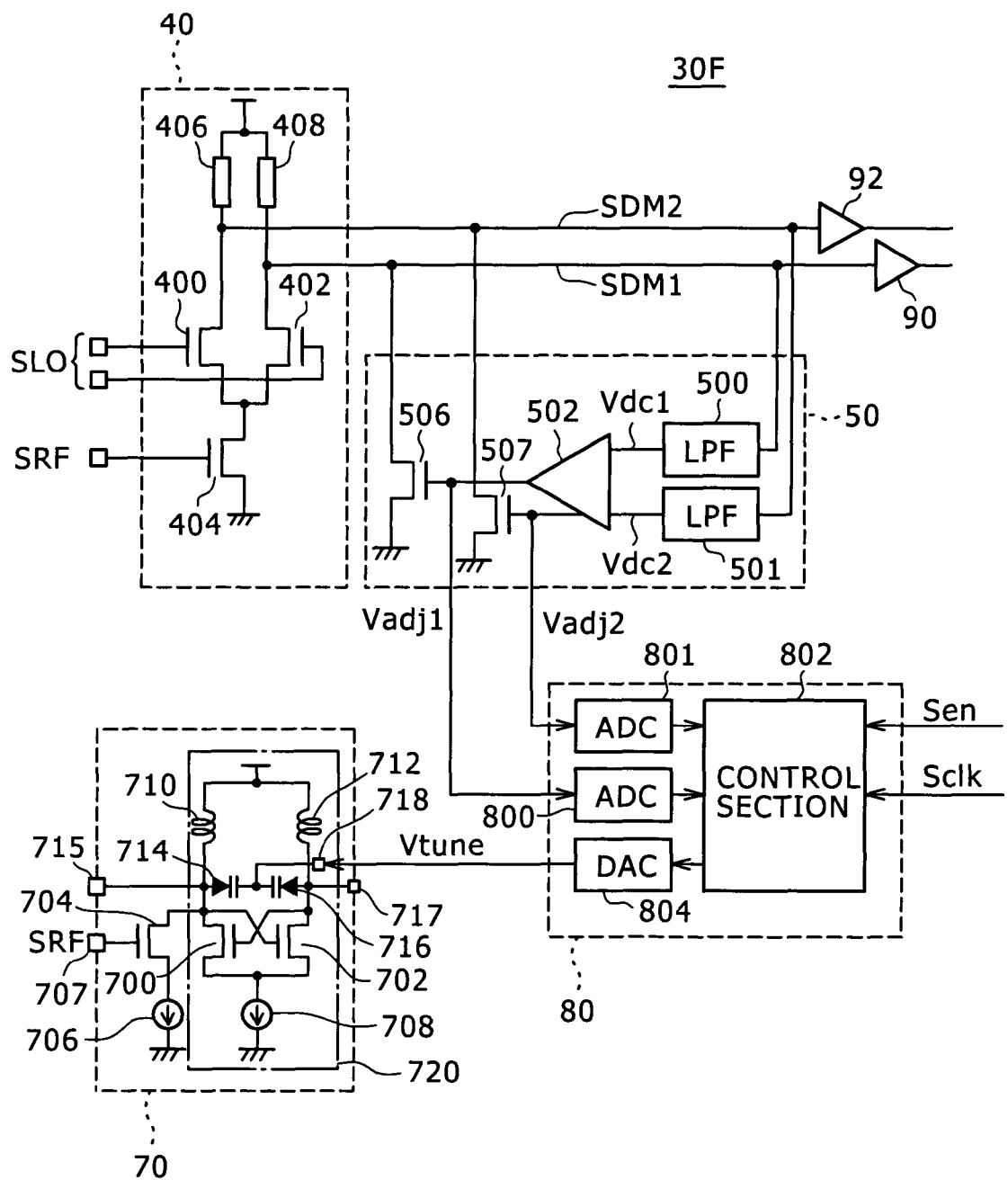
FIG. 16 is a block diagram showing an example of a circuit configuration of a mixer, a DC correction section, a phase correction section and a local oscillator of the demodulator of FIG. 15.
Figure 17A:
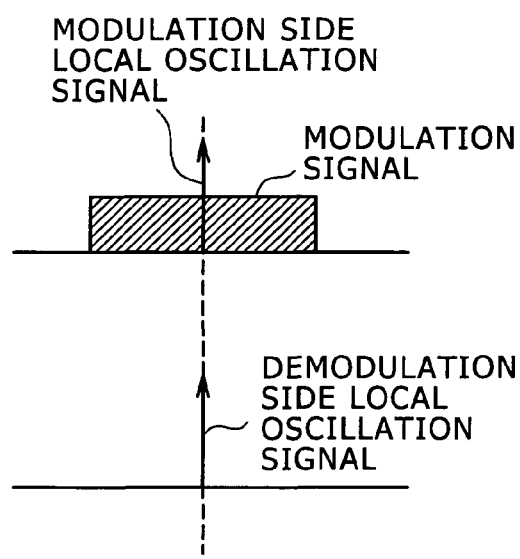
FIG. 17A is a diagrammatic view illustrating a frequency allocation of a local oscillation signal and a modulation signal where frequency synchronization of the local oscillation signal is carried out.
Figure 17B:
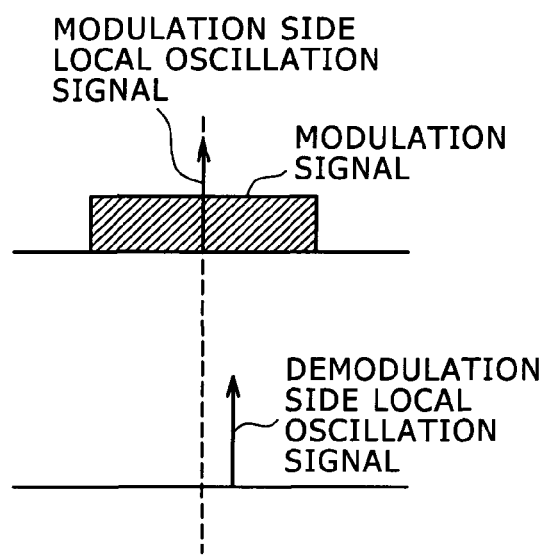
FIG. 17B is a diagrammatic view illustrating a frequency allocation of a local oscillation signal and a modulation signal where frequency synchronization of the local oscillation signal is not carried out.
Figure 17C:
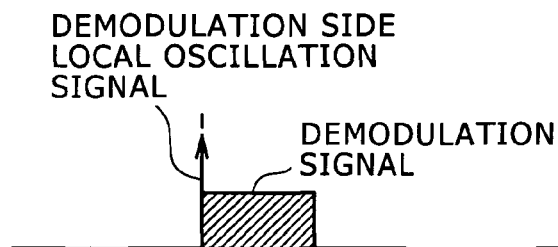
FIG. 17C is a diagrammatic view illustrating a frequency allocation of a demodulation signal where frequency synchronization is carried out.
Figure 17D:
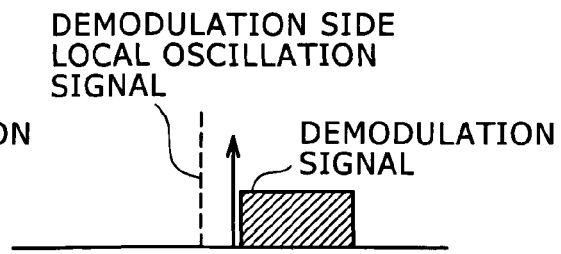
FIG. 17D is a diagrammatic view illustrating a frequency allocation of a demodulation signal where frequency synchronization is not carried out.
Figure 18:
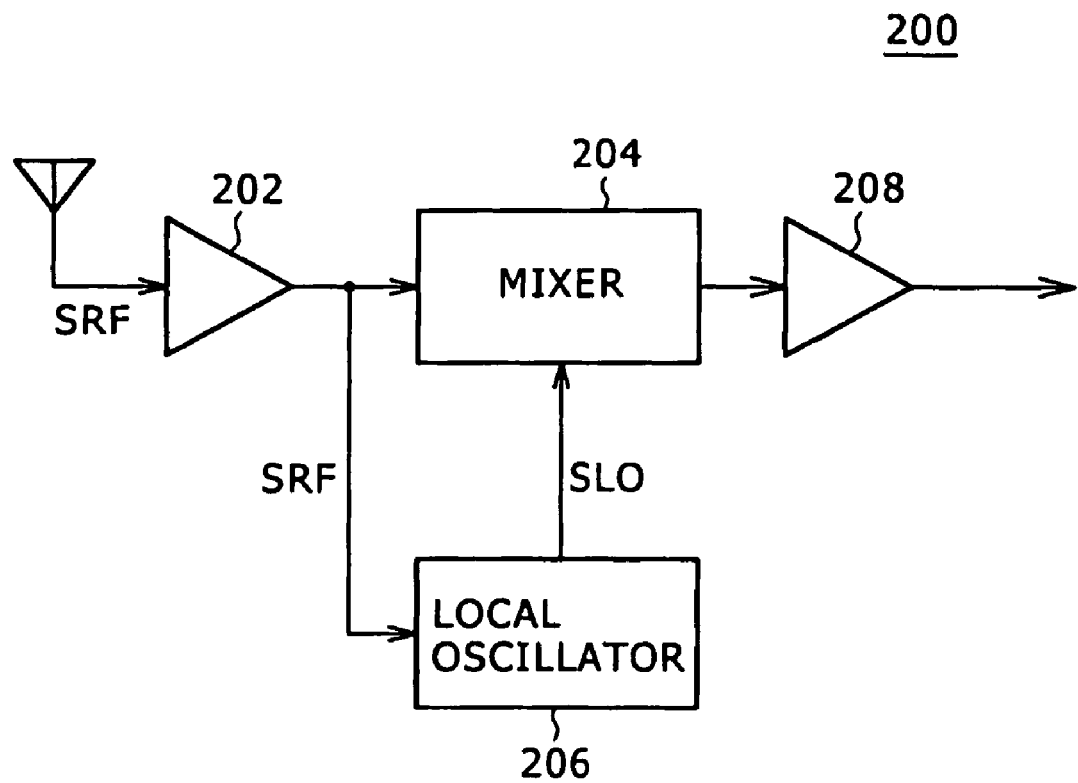
FIG. 18 is a block diagram showing a configuration of an existing demodulator.

FIG. 16 shows an example of a circuit configuration of the demodulator 30F. Referring to FIG. 16, the DC correction section 50 includes a first low-pass filter 500, a second low-pass filter 501, a comparator 502, and transistors 506 and 507. The phase correction section 80 includes a first A/D conversion section 800, a second A/D conversion section 801, a control section 802 and a D/A conversion section 804.

[Example of Operation of the Demodulator]

In the sixth embodiment, operation similar to the phase synchronization operation of the demodulator 30D described hereinabove in connection with the fourth embodiment is carried out. In particular, the phase correction section 80 produces a phase correction signal Vtune whose amplitude level varies stepwise based on the clock signal Sclk and outputs the phase correction signal Vtune to the local oscillator 70 as seen in FIG. 11C. The DC correction section 50 produces DC-correction voltages Vadj1 and Vadj2 for correcting the DC voltages Vdc1 and Vdc2 of the demodulation signals SDM1 and SDM2 caused by a phase difference between the local oscillation signals SLO and the modulation signal SRF synchronized in phase with the local oscillation signals SLO as seen in FIG. 11E.

The A/D conversion section 800 of the phase correction section 80 converts the DC correction voltage Vadj1 supplied thereto from the DC correction section 50 into an analog signal and supplies the analog signal to the control section 802. The second A/D conversion section 801 converts the DC correction voltage Vadj2 supplied thereto from the DC correction section 50 into an analog signal and supplies the analog signal to the control section 802.

The control section 802 selects a DC correction voltage Vadj1 and another DC correction voltage Vadj2 with which the voltage difference between the DC correction voltage Vadj1 and the DC correction voltage Vadj2 becomes maximum as seen in FIG. 11E. Then, the control section 802 reads out the phase correction signals Vtune corresponding to the selected DC correction voltages Vadj1 and Vadj2 from the storage section and outputs the phase correction signals Vtune to the D/A conversion section 804 as seen in FIG. 11C.

The demodulation signal SDM1 outputted from the mixer 40 and having the corrected DC voltage Vdc1 and so forth is amplified by and outputted from the amplifier 90. Similarly, the demodulation signal SDM2 having the corrected DC voltage Vdc2 is amplified by and outputted from the amplifier 92.

As described above, according to the present embodiment, since the phase correction section 80 differentially detects the DC correction voltages Vadj1 and Vadj2, the SN ratio of the DC correction voltage can be increased. Consequently, stabilized phase correction can be carried out.

It is to be noted that the technical scope of the present invention is not limited to the embodiments described hereinabove but includes various modified forms of the embodiments described hereinabove without departing from the subject matter of the present invention. For example, while, in the first to sixth embodiments described hereinabove, a MOSFET is used for the transistors, the transistors are not limited to this, but a transistor of the bipolar type may be used instead.

The present application contains subject matter related to that disclosed in Japanese Priority Patent Application JP 2009-131094 filed with the Japan Patent Office on May 29, 2009, the entire content of which is hereby incorporated by reference.

What is claimed is:

1. A demodulator, comprising:
a frequency synchronization section adapted to synchronize a frequency of a local oscillation signal to be produced on the demodulator side with a local oscillation frequency of a modulation signal transmitting from a modulator side;
a demodulation signal production section adapted to produce a demodulation signal based on the local oscillation signal synchronized by said frequency synchronization section and the modulation signal transmitted from the modulator;
a direct current correction section adapted to detect a direct current voltage of the demodulation signal from the demodulation signal produced by said demodulation signal production section and correct the direct current voltage of the demodulation signal so that the direct current voltage becomes equal to a reference voltage set in advance; and
a phase correction section adapted to synchronize a phase of the local oscillation signal and a phase of the modulation signal with each other based on the direct current voltage of the demodulation signal detected by said direct current correction section.

2. The demodulator according to claim 1, wherein
said phase correction section produces a phase correction signal having a level which varies at a plurality of stages for controlling the phase of the local oscillation signal and supplies the produced signal to said frequency synchronization section;
said phase correction section acquires a direct current correction voltage produced in accordance with the direct current voltage of the demodulation signal obtained by multiplying the modulation signal and the local oscillation signal outputted from said frequency synchronization section based on the phase correction signal from said direct current correction section; and
said phase correction section selects the phase correction signal when a value of the direct current correction voltage from among the values of the direct current correction voltage acquired from said direct current correction section becomes maximum as a phase correction signal for synchronizing the phases of the local oscillation signal and the modulation signal with each other.

3. The demodulator according to claim 1, wherein
said demodulation signal production section includes
a differential pair of first and second transistors to which differential local oscillation signals are inputted;
a third transistor connected at a drain thereof to the sources of the first and second transistors and at a source thereof connected to a low-potential power supply and adapted to receive the modulation signal inputted thereto;
a first resistor connected between the drain of the first transistor and a high-potential power supply; and
a second resistor connected between the drain of the second transistor and the high-potential power supply; and
said direct current correction section includes
a low-pass filter adapted to pass the direct current voltage of the demodulation signal outputted from the first resistor or the second resistor of said demodulation signal production section;
a comparison section adapted to output a difference voltage obtained by comparing the direct current voltage of the demodulation signal passing through the low-pass filter and the reference voltage with each other as a direct current offset; and
a transistor connected at a drain thereof to the first resistor or the second resistor, at a gate thereof to the comparison section and at a source thereof to the low-potential power supply.

4. A demodulator, comprising:
a frequency synchronization section adapted to synchronize a frequency of a local oscillation signal to be produced on the demodulator side with a local oscillation frequency of a modulation signal transmitting from a modulator side;
a demodulation signal production section adapted to produce first and second differential demodulation signals based on the local oscillation signal synchronized by said frequency synchronization section and the modulation signal transmitted from the modulator;
a first direct current correction section adapted to detect a first direct current voltage from the first demodulation signal produced by said demodulation signal production section and correct the first direct current voltage so that the first direct current voltage becomes equal to a first reference voltage set in advance;
a second direct current correction section adapted to detect a second direct current voltage from the second demodulation signal produced by said demodulation signal production section and correct the second direct current voltage so that the second direct current voltage becomes equal to a second reference voltage set in advance; and
a phase correction section adapted to synchronize a phase of the local oscillation signal and a phase of the modulation signal with each other based on a difference voltage between the first direct current voltage detected by said first direct current correction section and the second direct current voltage detected by said second direct current correction section.

5. The demodulator according to claim 4, wherein
said demodulation signal production section includes
a differential pair of first and second transistors to which differential local oscillation signals are inputted;
a third transistor connected at a drain thereof to the sources of the first and second transistors and at the source thereof to a low-potential power supply and adapted to receive the modulation signal inputted thereto;
a first resistor connected between the drain of the first transistor and a high-potential power supply; and
a second resistor connected between the drain of the second transistor and the high-potential power supply; and
said first direct current correction section includes
a low-pass filter adapted to pass the first direct current voltage of the first demodulation signal outputted from the first resistor of said demodulation signal production section;
a comparison section adapted to output a difference voltage obtained by comparing the first direct current voltage of the first demodulation signal passing through the low-pass filter and the first reference voltage as a direct current offset; and
a transistor connected at a drain thereof to the first resistor, at a gate thereof to the comparison section and at a source thereof to the low-potential power supply; and
said second direct current correction section includes a low-pass filter adapted to pass the second direct current voltage of the second demodulation signal outputted from the second resistor of said demodulation signal production section;

a comparison section adapted to output a difference voltage obtained by comparing the second direct current voltage of the second demodulation signal passing through the low-pass filter and the second reference voltage as a direct current offset; and a transistor connected at a drain thereof to the second resistor, at a gate thereof to said comparison section and at a source thereof to the low-potential power supply.

6. A demodulator, comprising:

a frequency synchronization section adapted to synchronize a frequency of a local oscillation signal to be produced on the demodulator side with a local oscillation frequency of a modulation signal transmitting from a modulator side;

a demodulation signal production section adapted to produce first and second differential demodulation signals based on the local oscillation signal synchronized by said frequency synchronization section and the modulation signal transmitted from the modulator;

a direct current correction section adapted to detect a first direct current voltage of the demodulation signal from the first demodulation signal produced by said demodulation signal production section and detect a second direct current voltage of the demodulation signal from the second demodulation signal and then correct at least one of the first direct current voltage and the second direct current voltage so that a potential difference between the first direct current voltage and the second direct current voltage becomes minimum; and a phase correction section adapted to synchronize a phase of the local oscillation signal and a phase of the modulation signal based on a difference voltage between the first direct current voltage and the second direct current voltage detected by said direct current correction section.

7. The demodulator according to claim 6, wherein
said demodulation signal production section includes
a differential pair of first and second transistors to which differential local oscillation signals are inputted;
a third transistor connected at a drain thereof to the sources of the first and second transistors and at a source thereof to a low-potential power supply and adapted to receive the modulation signal inputted thereto;
a first resistor connected between the drain of the first transistor and a high-potential power supply; and
a second resistor connected between the drain of the second transistor and the high-potential power supply; and
said direct current correction section includes
a first low-pass filter connected to the first resistor of said demodulation signal production section adapted to pass the first direct current voltage of the first demodulation signal outputted from said demodulation signal production section;
a second low-pass filter connected to the second resistor of said demodulation signal production section adapted to pass the second direct current voltage of the second demodulation signal outputted from said demodulation signal production section;
a comparison section adapted to output, as a direct current offset, a difference voltage obtained by comparing the first direct current voltage of the first demodulation signal passing through the first low-pass filter and the second direct current voltage of the second demodulation signal passing through the second low-pass filter with each other;

a first transistor connected at a drain thereof to the first resistor of said demodulation signal production section, at a gate thereof to the comparison section and at a source thereof to the low-potential power supply; and a second transistor connected at a drain thereof to the second resistor of said demodulation signal production section, at a gate thereof to the comparison section and at a source thereof to the low-potential power supply.

8. A communication apparatus, comprising:

a modulator adapted to modulate a modulation object signal with a first local oscillation signal to produce a modulation signal and transmit the produced modulation signal;

a frequency synchronization section adapted to synchronize a frequency of a second local oscillation signal to be produced on the demodulator side with a local oscillation frequency of the modulation signal transmitted from said modulator;

a demodulation signal production section adapted to produce a demodulation signal based on the second local oscillation signal synchronized by said frequency synchronization section and the modulation signal transmitted from said modulator; and a demodulator having a direct current correction section adapted to detect a direct current voltage of the demodulation signal from the demodulation signal produced by said demodulation signal production section and correct the direct current voltage of the demodulation signal so that the direct current voltage becomes equal to a reference voltage set in advance;

the demodulator further including a phase correction section adapted to synchronize a phase of the local oscillation signal and a phase of the modulation signal with each other based on the direct current voltage of the demodulation signal detected by said direct current correction section.

9. A demodulator, comprising:

frequency synchronization means for synchronizing a frequency of a local oscillation signal to be produced on the demodulator side with a local oscillation frequency of a modulation signal transmitting from a modulator side;

demodulation signal production means for producing a demodulation signal based on the local oscillation signal synchronized by said frequency synchronization means and the modulation signal transmitted from the modulator;

direct current correction means for detecting a direct current voltage of the demodulation signal from the demodulation signal produced by said demodulation signal production means and correcting the direct current voltage of the demodulation signal so that the direct current voltage becomes equal to a reference voltage set in advance; and phase correction means for synchronizing a phase of the local oscillation signal and a phase of the modulation signal with each other based on the direct current voltage of the demodulation signal detected by said direct current correction section.

10. A demodulator, comprising:

frequency synchronization means for synchronizing a frequency of a local oscillation signal to be produced on the demodulator side with a local oscillation frequency of a modulation signal transmitting from a modulator side;

demodulation signal production means for producing first and second differential demodulation signals based on the local oscillation signal synchronized by said frequency synchronization means and the modulation signal transmitted from the modulator;

first direct current correction means for detecting a first direct current voltage from the first demodulation signal produced by said demodulation signal production means and correcting the first direct current voltage so that the first direct current voltage becomes equal to a first reference voltage set in advance;

second direct current correction means for detecting a second direct current voltage from the second demodulation signal produced by said demodulation signal production means and correcting the second direct current voltage so that the second direct current voltage becomes equal to a second reference voltage set in advance, and phase correction means for synchronizing a phase of the local oscillation signal and a phase of the modulation signal with each other based on the direct current voltage of the demodulation signal detected by said direct current correction section.

11. A demodulator, comprising:

frequency synchronization means for synchronizing a frequency of a local oscillation signal to be produced on the demodulator side with a local oscillation frequency of a modulation signal transmitting from a modulator side;

demodulation signal production means for producing first and second differential demodulation signals based on the local oscillation signal synchronized by said frequency synchronization means and the modulation signal transmitted from the modulator;

direct current correction means for detecting a first direct current voltage of the demodulation signal from the first demodulation signal produced by said demodulation signal production means and detecting a second direct current voltage of the demodulation signal from the second demodulation signal and then correcting at least one of the first direct current voltage and the second direct current voltage so that a potential difference between the first direct current voltage and the second direct current voltage becomes minimum; and phase correction means for synchronizing a phase of the local oscillation signal and a phase of the modulation signal with each other based on the direct current voltage of the demodulation signal detected by said direct current correction section.

* * * * *